United States Patent [19]
Kai et al.

[11] Patent Number: 5,606,346
[45] Date of Patent: Feb. 25, 1997

[54] COORDINATE INPUT DEVICE

[75] Inventors: Tsutomu Kai; Masahito Matsunami, both of Hirakata, Japan

[73] Assignee: Matsushita Electric Industrial Co., Ltd., Kadoma, Japan

[21] Appl. No.: 467,707

[22] Filed: Jun. 6, 1995

Related U.S. Application Data

[62] Division of Ser. No. 172,322, Dec. 21, 1993, abandoned.

[30] Foreign Application Priority Data

Dec. 22, 1992 [JP] Japan .................................. 4-341886
Feb. 3, 1993 [JP] Japan .................................. 5-16114
Feb. 23, 1993 [JP] Japan .................................. 5-33075

[51] Int. Cl.$^6$ .................................................. G09G 5/00
[52] U.S. Cl. ......................................... 345/173; 345/178
[58] Field of Search .......................... 371/48, 57.2, 64; 345/173, 178, 104; 178/18, 19

[56] References Cited

U.S. PATENT DOCUMENTS

| | | | |
|---|---|---|---|
| 4,775,765 | 10/1988 | Kimura et al. | 178/18 |
| 4,839,634 | 6/1989 | More et al. | 340/712 |
| 4,945,350 | 7/1990 | Kawamura | 340/784 |
| 4,975,692 | 12/1990 | Tateyama | 340/781 |
| 4,988,837 | 1/1991 | Murakami et al. | 178/18 |
| 5,078,476 | 1/1992 | Shin | 359/48 |
| 5,194,852 | 3/1993 | More et al. | 340/712 |
| 5,194,862 | 3/1993 | Edwards | 341/20 |
| 5,274,198 | 12/1993 | Landmeier | 178/18 |
| 5,313,225 | 5/1994 | Miyadera | 345/102 |
| 5,392,058 | 2/1995 | Tagawa | 345/104 |
| 5,420,804 | 5/1995 | Tanaka et al. | 178/18 X |
| 5,442,373 | 8/1995 | Nomura et al. | 345/173 X |
| 5,459,463 | 10/1995 | Gruaz et al. | 345/173 X |
| 5,491,706 | 2/1996 | Tagawa et al. | 371/57.2 |

FOREIGN PATENT DOCUMENTS

| | | |
|---|---|---|
| 61-60117 | 3/1986 | Japan . |
| 62-180417 | 8/1987 | Japan . |
| 2-255911 | 10/1990 | Japan . |
| 4-138417 | 5/1992 | Japan . |
| 4-245217 | 9/1992 | Japan . |

OTHER PUBLICATIONS

IBM Technical Disclosure Bulletin, vol. 34, No. 7B, Dec. 1991, "Methods To Minimize The Effects Of LCD M-Signal Noise On The Operation Of An Attached Sensor Screen", pp. 435–436.

Primary Examiner—Ulysses Weldon
Attorney, Agent, or Firm—Renner, Otto, Boisselle, Sklar

[57] ABSTRACT

A coordinate input device including a matrix-type display panel having a plurality of row electrodes arranged in parallel, a plurality of column electrodes arranged in parallel, the row electrodes and the column electrodes being disposed to face each other, and liquid crystal disposed between the row electrodes and the column electrodes. The device also includes a row electrode driving circuit, a column electrode driving circuit, a controller for controlling these driving circuits, an input pad disposed to allow direct contact with the operator, and a coordinate detection circuit for calculating a coordinate value based on a signal input thereto through the input pad. When a position on the display panel is pressed with a finger, a driving signal supplied to the row electrode or the column electrode corresponding to the position is transmitted through the operator to the input pad. The coordinate of the position is detected based on the transmitted signal.

2 Claims, 19 Drawing Sheets

5,606,346

COORDINATE INPUT DEVICE

This application is a Divisional of application Ser. No. 08/172,322 filed Dec. 21, 1993, now abandoned.

BACKGROUND OF THE INVENTION

1. Field of the Invention:

The present invention relates to a coordinate input device using a matrix-type display panel.

2. Description of the Related Art:

In recent years, as an input device for an information apparatus such as a computer and an electronic organizer, a tablet, a touch-sensitive panel, and the like are replacing the conventional keyboard and scanner. For example, U.S. Pat. No. 4,848,496 describes an electromagnetic induction type tablet used as an input device for a computer using a detective pen as an input means, where a display device is disposed on the input device. U.S. Pat. No. 4,831,568 describes a tablet having an analog resistance film used as an input device for an electronic organizer, where a display device is disposed under the tablet. The number of such information apparatuses has increased.

However, the above information apparatuses have disadvantages. The cost increases since they include an input device and a display device separately. Further, the input device and the display device must be precisely aligned with each other, which results in the increase in the number of manufacturing steps. Also, the size and weight of the input device and the display device may be critical for a portable information apparatus. When a tablet having a resistance film is used as the input device, the input device is disposed on the display device as described above. In this case, since the transmittance of the tablet is as low as 7.0%, the entire transmittance reduces. As a result, the luminance of the display device with the tablet disposed thereon is only approximately 80% of that of the display device without the tablet thereon. It is possible to increase the luminance by increasing the luminance of a back light used. However, since a portable information apparatus is driven by a battery which necessitates a low power consumption, there is a limitation in increasing the luminance of the back light. For these reasons, only a binary display (black and white) is allowed for an information apparatus using a tablet with a low transmittance, making it difficult to realize a gradation display.

In order to overcome the above problem, Japanese Laid-Open Patent Publication Nos. 54-24588, 62-180417, and 2-255911, and U.S. Pat. No. 4,839,634 disclose matrix-type display panels used both for a display device and a coordinate input device. For example, in a conventional tablet integrated with a display device (hereinafter, such a tablet is referred to as a display-integrated tablet) described in Japanese Laid-Open Patent Publication No. 2-255911, a scanning pulse is applied to driving electrodes disposed in a display panel, and the scanning pulse is detected through capacitances between the respective driving electrodes and a detective pen. The detective pen is electrically connected to a detection circuit of the display-integrated tablet. When the maximum output is detected at one of the driving electrodes, the position corresponding to the driving electrode is determined to be the coordinate of the position touched by the detective pen.

Thus, the coordinate can be detected without disposing a separate input device on the display device. In such a conventional display-integrated tablet, however, it is difficult to effect the input using a finger instead of the detective pen. Using the finger is easier and more convenient than using the detective pen for an application including only menu selections. The coordinate input with the finger is conducted as follows: The operator touches a position on the display with a finger while simultaneously contacting a portion of his or her body other than the finger with an input terminal of a signal detection circuit incorporated in the display-integrated tablet. A signal is then transmitted from the finger to the input terminal through the body. The coordinate is detected based on the received signal. This input with the finger is however disadvantageous in that the resistance inside the human body is high and that noise such as an ambient electromagnetic wave and the like enters the signal during the transmission of the signal through the human body. As a result, the precision of the coordinate detection becomes low.

For the conventional display-integrated tablet, various types of noises enter the signal for the coordinate detection even when the detective pen is used. These noises are caused because the same panel is used both for the display and the coordinate input. Noises from a back light and an inverter disposed in the device is especially influential, reducing the resolution of the coordinate detection. Further, the frequency of the inverter is very close to that of the signal to be detected. It is therefore difficult to eliminate a noise generated from the inverter by using a filter or the like. A tight shield is required to eliminate such a noise. This causes cost increase and difficulty in designing the entire apparatus.

SUMMARY OF THE INVENTION

The coordinate input device of this invention, includes: a display panel including: a plurality of row electrodes and a plurality of column electrodes arranged in a matrix; and a plurality of display elements, each connected to one of the crossings of the plurality of row electrodes and the plurality of column electrodes; row electrode driving means for supplying a row electrode driving signal to each of the plurality of row electrodes; column electrode driving means for supplying a column electrode driving signal to each of the plurality of column electrodes; an input pad which is electrically connected, when a position on the display panel is indicated, to at least one of the row electrodes and the column electrodes corresponding to the indicated position, the input pad receiving an electrostatic induction signal which is generated in accordance with at least one of the row electrode driving signal supplied to the corresponding one of the row electrodes and the column electrode driving signal supplied to the corresponding one of the column electrodes, the input pad generating a detection signal; and coordinate detection means, electrically connected to the input pad, for receiving the detection signal from the input pad and for detecting a coordinate value for the indicated position based on the detection signal.

According to another aspect of the present invention, the coordinate input device includes: a display panel including: a plurality of row electrodes and a plurality of column electrodes arranged in a matrix, the plurality of column electrodes being disposed above the plurality of row electrodes, the plurality of column electrodes having divided electrodes each divided into a first electrode portion and a second electrode portion and non-divided electrodes; and a plurality of display elements, each connected to one of the crossings of the plurality of row electrodes and the plurality of column electrodes; a row electrode driving circuit for supplying a row electrode driving signal to each of the plurality of row electrodes; a first column electrode driving circuit for supplying a first column electrode driving signal to the first electrode portions of each of the divided electrodes; a second column electrode driving circuit for supplying a second column electrode driving signal to each of the second electrode portions of the divided electrodes and the non-divided electrodes; input means electrically connected, when a position on the display panel is indicated, to at least one of the first electrode portions, the second electrode portions, and the non-divided electrodes corresponding to the indicated position, for inputting as a detection signal at least one of the first column electrode driving signal, the second column electrode driving signal, and the non-divided electrode corresponding to the indicated position; and coordinate detection means connected to the input means, for receiving the detection signal from the input means and for detecting a coordinate value of the indicated position based on the level of the detection signal.

According to yet another aspect of the present invention, the coordinate input device includes: a display panel including: a plurality of row electrodes and a plurality of column electrodes arranged in a matrix; and a plurality of display elements, each connected to one of the crossings of the plurality of row electrodes and the plurality of column electrodes; row electrode driving means for, during a display period and a row coordinate detection period, sequentially supplying row electrode driving signals to the plurality of row electrodes to effect scanning of the plurality of row electrodes, and for fixing the potential of the plurality of row electrodes constant during a column coordinate detection period; column electrode driving means for sequentially supplying display signals to the plurality of column electrodes during the display period, for sequentially supplying column electrode driving signals to the plurality of column electrodes to effect scanning of the plurality of column electrodes during the column coordinate detection period, and for fixing the potential of the plurality of column electrodes constant during the row coordinate detection period; coordinate detection means for detecting a coordinate value of an indicated position on the display panel; a back light disposed on the back side of the display panel for illuminating the display panel; an inverter circuit for generating a back light driving signal for driving the back light; and control means for effecting switching among the display period, the row coordinate detection period, and the column coordinate detection period, the control means controlling the row electrode driving means to supply the row electrode driving signals in synchronization with the back light driving signals during the row coordinate detection period, and controlling the column electrode driving means to supply the column electrode driving signals in synchronization with the back light driving signals during the column coordinate detection period.

Thus, according to the coordinate input device of the present invention, an indicated position on the display panel can be detected by electrically connecting a driving electrode corresponding to the indicated position with the input terminal of the detection circuit, allowing the user to conduct the coordinate input with a finger as well as with a detective pen.

With the above-described structure, a random noise entering the signal from an inverter and/or back light can be reduced by fixing the phase of the noise. This is realized by synchronizing driving signals which are supplied to the driving electrodes with the output of the inverter. Further, the precision of the absolute position on the display panel can be improved by twice repeating the coordinate detection operations synchronously with the outputs of the inverter having phases different from each other by 180° and averaging the coordinates obtained from these operations.

Thus, the invention described herein makes possible the advantage of providing a coordinate input device integrated with a liquid crystal display device, where the coordinate can be detected with high precision without being influenced by a noise generated inside a human body when a finger is used for the input, a noise caused by the device itself, especially caused by an inverter and a back light of the device.

This and other advantages of the present invention will become apparent to those skilled in the art upon reading and understanding the following detailed description with reference to the accompanying figures.

DESCRIPTION OF THE PREFERRED EMBODIMENTS

Figure 1A:
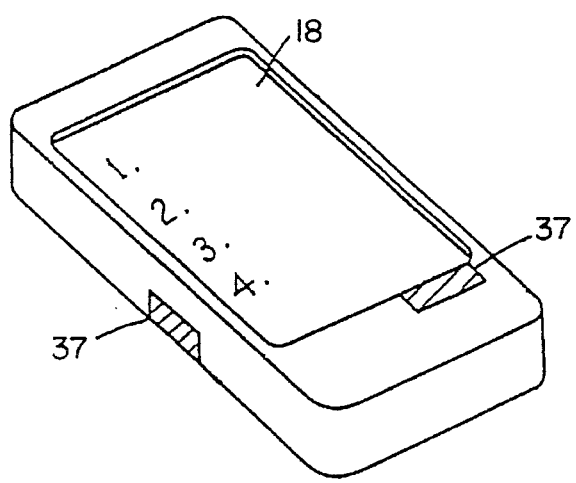
FIGS. 1A and 1B are schematic perspective views of information apparatuses incorporating coordinate input devices of the present invention.
Figure 1B:
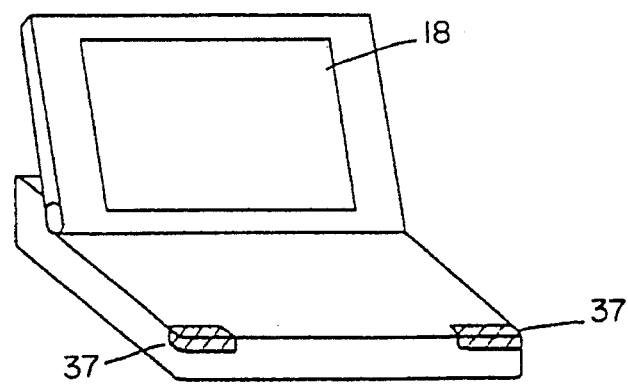

FIG. 1A shows a portable information apparatus and FIG. 1B shows a desk-top type information apparatus. These information apparatuses have a coordinate input device of the present invention incorporated therein. The coordinate input device includes a liquid crystal display panel (LCD panel) 18 as a display and an input pad 37 used for detecting a coordinate. For example, the user presses an intended position on a menu on the LCD panel 18 with a finger of one hand, while holding the portable information apparatus of FIG. 1A with the other hand so that a portion of the hand contacts the input pad 37 which constitutes part of the coordinate input device. In the case of the information apparatus of FIG. 1B, the user presses an intended position on the LCD panel 18 with a finger of one hand, while contacting the input pad 37 with the other hand. In either operation, the LCD panel 18 and the input pad 37 are electrically connected with each other, allowing a driving signal supplied to the LCD panel 18 to be transmitted to a coordinate detection circuit (not shown in FIGS. 1A and 1B) incorporated in the information apparatus through the input pad 37.

Figure 2:
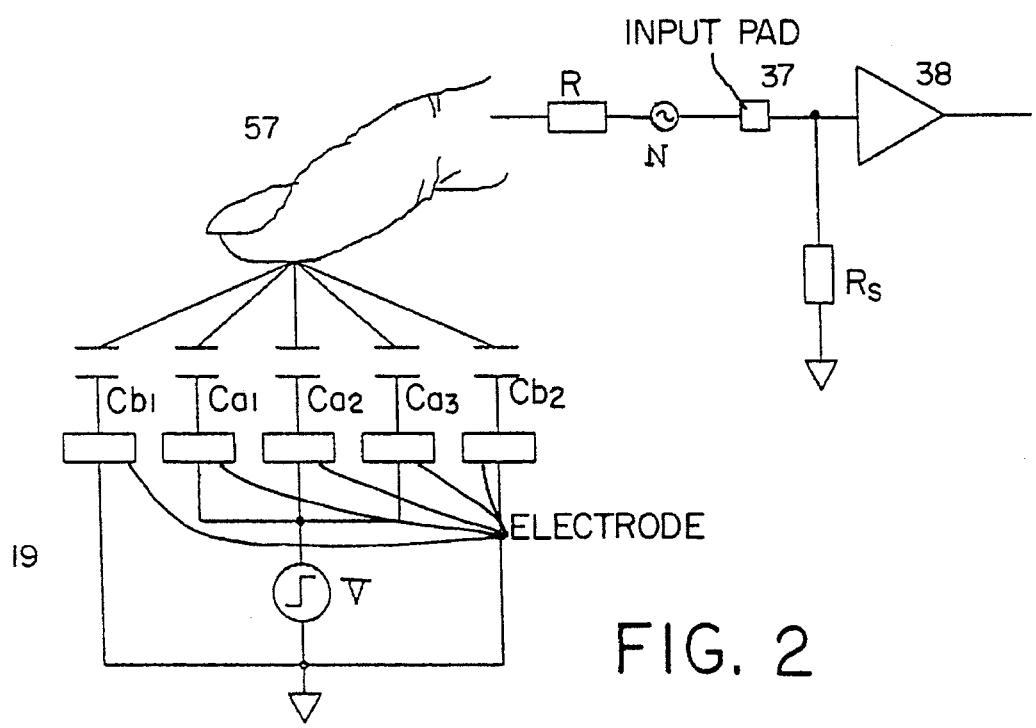
FIG. 2 is a diagrammatic view showing the input portion of the coordinate input device of the present invention when it is connected through a finger.
Figure 3:
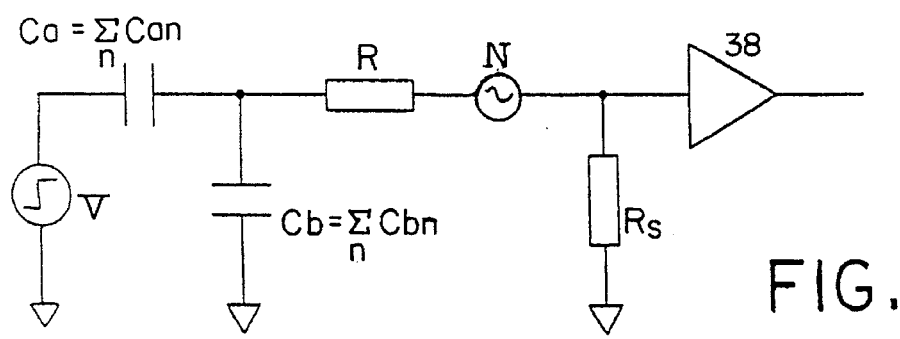
FIG. 3 is an equivalent circuit diagram based on the connected condition of FIG. 2.

FIG. 2 diagrammatically shows the electrical connection in the apparatus when a position on the LCD panel 18 is pressed with a finger. Electrodes 19 disposed in the LCD panel 18 are connected to a signal source which generates a signal for driving the LCD panel 18. As shown in FIG. 2, when a finger 57 presses a position on the LCD panel 18, it is electrically connected to one of the electrodes 19 corresponding to the position through a capacitance $Ca_n$ and simultaneously connected with GND through a capacitance $Cb_n$ where n is an integer equal to or more than 1. Since the electrode 19 is electrically connected to the signal source, a signal generated from the signal source is transmitted to the finger 57 through the capacitance $Ca_n$, and through the human body to the input pad 37. The signal is also connected to GND with a certain impedance. FIG. 3 shows the equivalent circuit showing this electrical connection. Potential V' at the input pad 37 is represented by the equation:

$$V' = \frac{jwCaRs}{1+jw(Ca+Cb)(R+Rs)} \left( V - \frac{(Ca+Cb)}{Ca} N \right) \quad (1)$$

where V is the potential of the signal generated from the signal source and supplied to the electrode 19, R is the resistance in the human body, N is the equivalent noise voltage generated in the human body, and Rs is the input impedance at the detection circuit. When Rs is infinite, the following equation is obtained:

$$V' = \frac{Ca}{Ca+Cb} V - N \quad (2)$$

Since Ca+Cb is constant, capacitance Ca can be directly monitored by monitoring the variation in potential V'. Capacitance Ca is greater as the distance between the finger 57 and the electrode 19 is shorter. Thus, the position of the finger 57 on the LCD panel 18 can be detected by calculating the maximum of potential V'.

Examples of the coordinate input device according to the present invention will be described with reference to the drawings.

EXAMPLE 1

Figure 4:
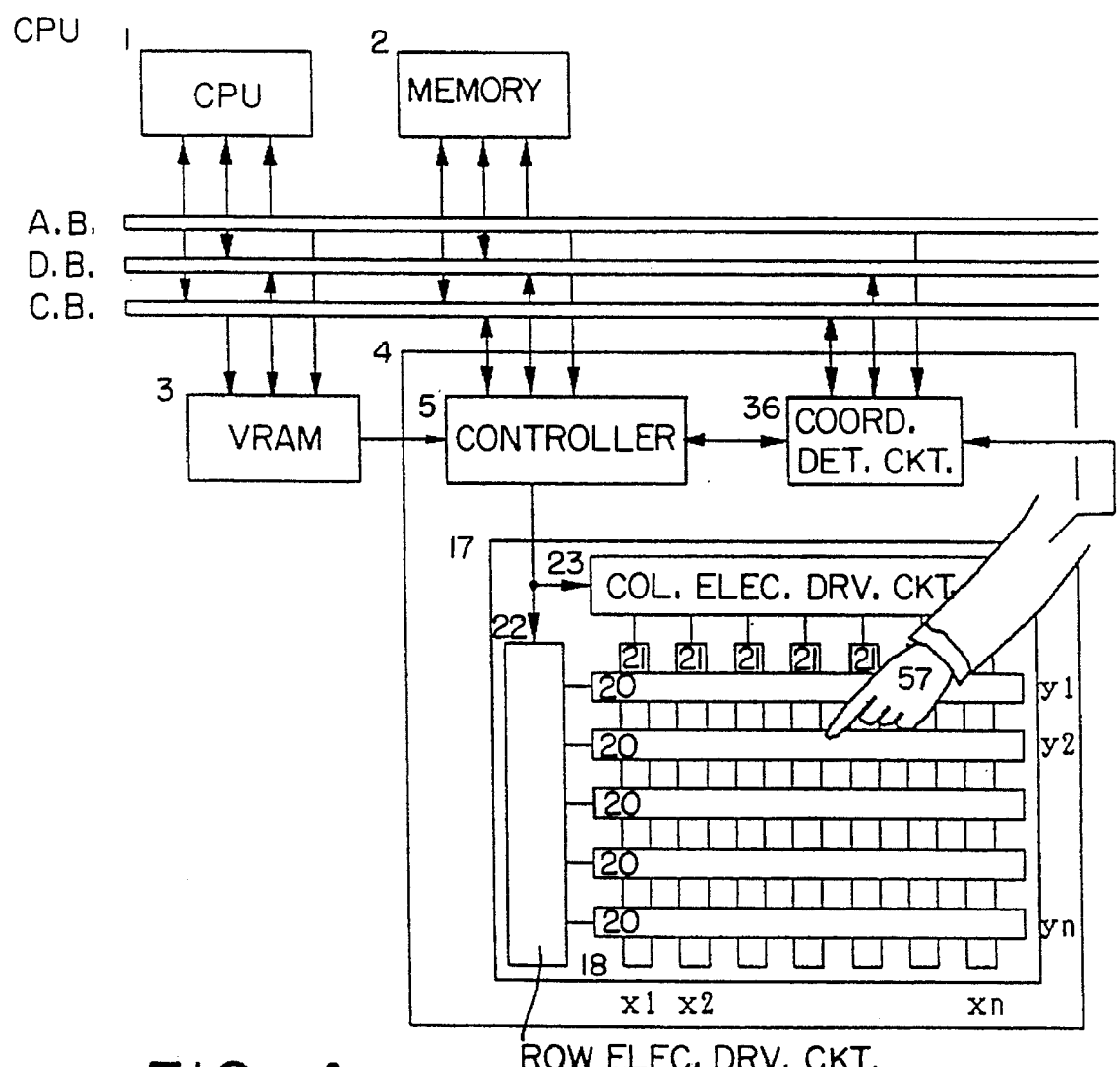
FIG. 4 is a block diagram showing a first example of the coordinate input device of the present invention.

FIG. 4 is a simplified block diagram of an information apparatus using a first example of the coordinate input device of the present invention. The information apparatus includes a CPU 1 for controlling blocks in the information apparatus, a memory 2 for temporarily holding operation information for the CPU 1, and a VRAM 3 for temporarily storing data for the display supplied from the CPU 1. The apparatus also includes an LCD module 17. The LCD module 17 includes the LCD panel 18 having a plurality of row electrodes 20 and a plurality of column electrodes 21, a row electrode driving circuit 22 connected to the row electrodes 20, and a column electrode driving circuit 23 connected to the column electrodes 21. In the LCD panel 18, the row electrodes 20 and the column electrodes 21 are arranged on different substrates (front and back substrates) which are disposed to face each other so that the row electrode 20 and the column electrodes 21 oppose each other forming a matrix together. Liquid crystal is contained between the two substrates. When a voltage is applied across a portion of the liquid crystal located at the crossing of the electrodes 20 and 21, the orientation of molecules in the portion of the liquid crystal changes. Using this property, the polarization of light incident to the liquid crystal and the transmission of light there-through are controlled, thereby controlling the display on the LCD panel 18. The principle of the operation of liquid crystal is described in T. Uchida, "Liquid crystal device and principle of its operation" The Journal of The Institute of Television Engineers of Japan, vol. 42, No. 1, pages 2–9 (1988). Details on the operation of the LCD panel 18 are therefore omitted herein.

In this example, the row electrodes 20 are disposed on the front substrate of the LCD panel 18. The row electrode driving circuit 22 and the column electrode driving circuit 23 which are controlled by an LCD controller 5 selectively supply voltages to the row electrodes 20 and the column electrodes 21, respectively. A coordinate detection circuit 36 includes the input pad 37 for receiving the driving signal transmitted through the capacitance between the electrodes 19 and the finger 57 pressing a position on the LCD panel 18 and through the human body to the other hand holding the apparatus. The coordinate detection circuit 36 calculates the coordinate values of the position on the LCD panel 18 pressed with the finger based on the signal received through the input pad 37.

The components constituting the coordinate input device of this example will be described. In this example, a simple matrix type panel with super-twisted nematic liquid crystal is used as the LCD panel 18. Other types of LCD panels and a plasma display can also be used.

Figure 5:
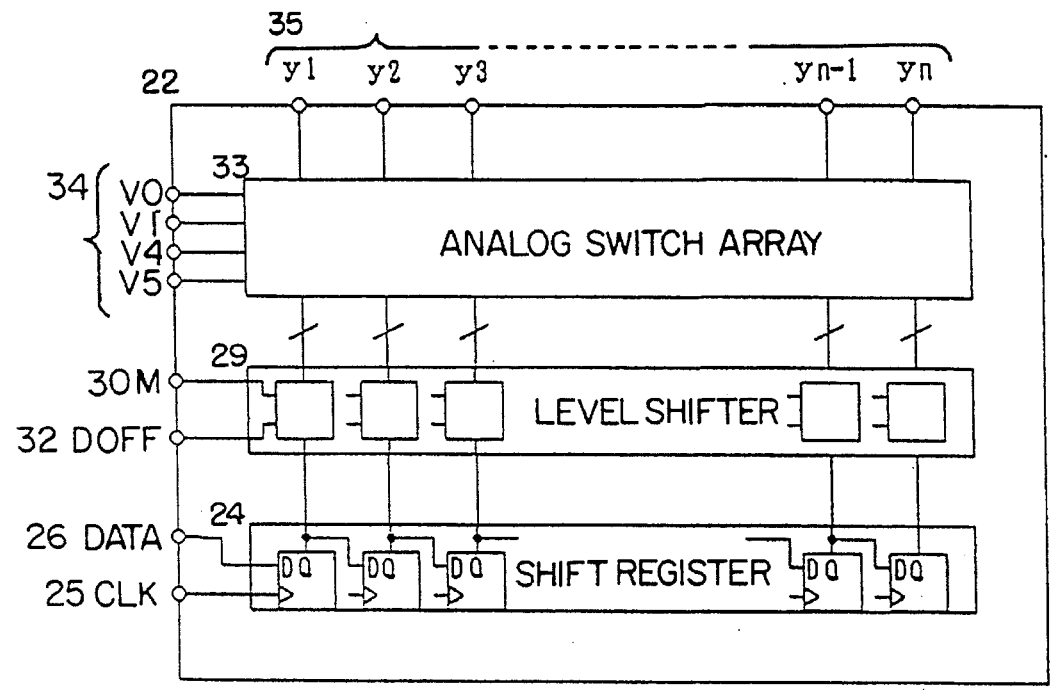
FIG. 5 is a structural view of a row electrode driving circuit according to the present invention.

FIG. 5 is a block diagram of the row electrode driving circuit 22 which includes a shift register 24, a level shifter 29, and an array of analog switches 33. The shift register 24 including a plurality of D flipflops connected in parallel has a clock (CLK) input terminal 25 and a data (DATA) input terminal 26. Data to be supplied to respective row electrodes yn (n=1, 2, ...) are sequentially input to the shift register 24 through the data input terminal 26. The input data is sequentially shifted in accordance with the clock input from the clock input terminal 25, and then output from the corresponding D flipflops to the level shifter 29. In addition to the data to be supplied to the respective row electrodes yn output from the shift register 24, the level shifter 29 receives an AC converted signal M from an input terminal 30 in such a manner that DC voltage will not be applied across the liquid crystal, and a display off signal DOFF from an input terminal 32. Depending on the signals DATA, M, and DOFF input to the level shifter 29, one of the predetermined combinations of CNT0, CNT1, CNT4, and CNT5 is selected as shown in Table 1 and output from the level shifter 29 to the corresponding analog switches 33. Each of the analog switches 33 is connected to power sources V0, V1, V4, and V5. These analog switches 33 respectively select one of the four power sources V0, V1, V4, and V5 depending on the combination supplied thereto from the level shifter 29, and thus the potential level at the selected power source is set for the corresponding electrode yn.

For example, assume that four analog switches 33 each of which has input terminals connected to the power sources V0, V1, V4, and V5 are used for one output, and that CNT0, CNT1, CNT4, and CNT5 are used as control signals allowing each of the analog switches 33 to select one of the power sources V0, V1 V4, and V5. Then, the potentials as shown in Table 1 are obtained for each output.

TABLE 1

| DOFF | M | DATA | CNT0 | CNT1 | CNT4 | CNT5 | Output |
|---|---|---|---|---|---|---|---|
| L | — | — | H | L | L | L | V0 |
| H | L | L | L | H | L | L | V1 |
| H | L | H | L | L | L | H | V5 |
| H | H | L | L | L | H | L | V4 |
| H | H | H | H | L | L | L | V0 |

Figure 6:
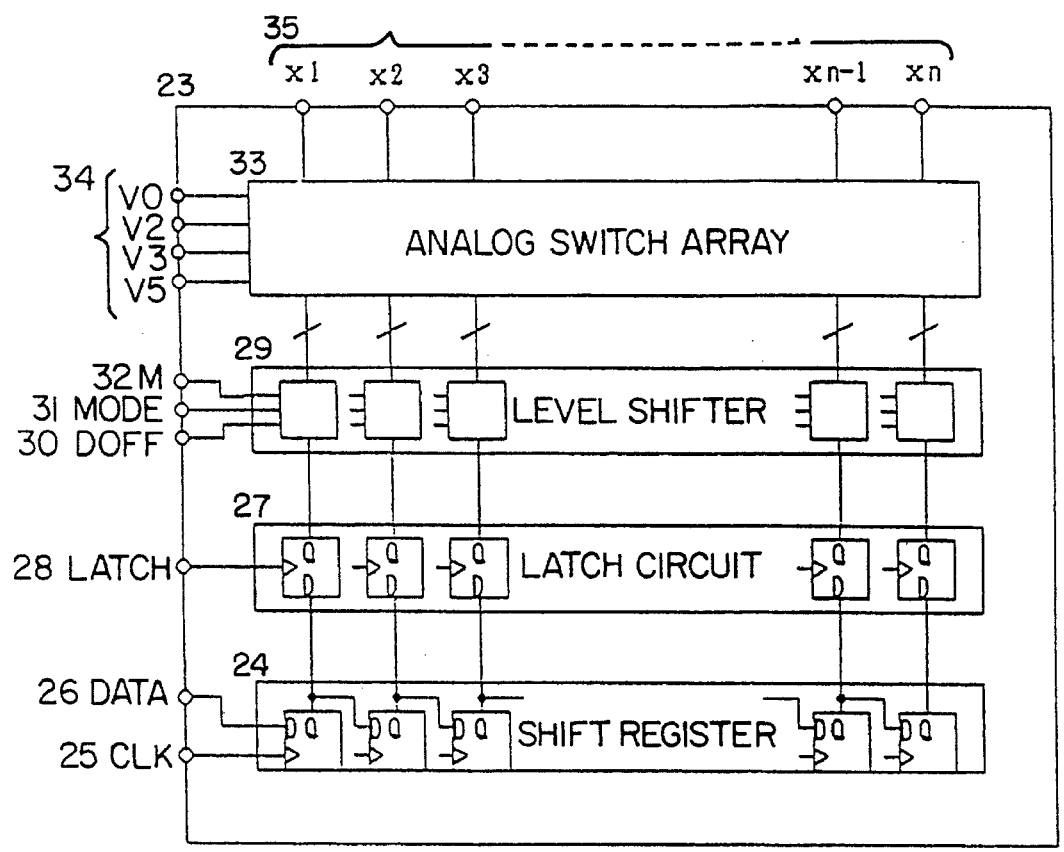
FIG. 6 is a structural view of a column electrode driving circuit according to the present invention.

FIG. 6 is a block diagram of the column electrode driving circuit 23 which includes a shift register 24, a latch circuit 27, a level shifter 29, and an array of analog switches 33. The shift register 24 receives a clock (CLK) from a clock input terminal 25 and data (DATA) to be supplied to respective column electrodes xn from a data input terminal 26. The input data is sequentially shifted in accordance with the clock, and then output from the corresponding D flipflops to the latch circuit 27. The latch circuit 27 outputs the data from the shift register 24 to the level shifter 29 synchronously with a signal LATCH supplied through an input terminal 28. In addition to the data from the latch circuit 27, the level shifter 29 receives an AC converted signal M from an input terminal 32, a display off signal DOFF from an input terminal 30, and a switching signal MODE from an input terminal 31. The signal MODE is a signal for switching between the display driving signal and the coordinate detection driving signal. Depending on the signals DATA, M, MODE, and DOFF, the level shifter 29 selects one of the predetermined combinations of CNT0, CNT2, CNT3, and CNT5 as shown in Table 2 and outputs it to the analog switches 33 corresponding to each column electrode xn. Each of the analog switches 33 is connected to power sources V0, V2, V3, and V5. These analog switches 33 respectively select one of the four power sources V0, V2, V3, and V5 depending on the combination supplied thereto from the level shifter 29, and thus the potential level at the selected power source is set for the corresponding electrode xn.

For example, assume that four analog switches 33 each of which has input terminals connected to the power sources V0, V2, V3, and V 5 are used for one output, and that CNT0, CNT2, CNT3, and CNT5 are used as control signals allowing each of the analog switches 33 to select one of the power sources V0, V2, V3, and V5. Then, the potentials as shown in Table 2 are obtained for each output. Though the data is normally input in parallel, it is assumed herein that the data is input in series, for simplification.

TABLE 2

| DOFF | MODE | M | DATA | CNT0 | CNT2 | CNT3 | CNT5 | Output |
|---|---|---|---|---|---|---|---|---|
| L | — | — | — | H | L | L | L | V0 |
| H | L | L | L | L | H | L | L | V2 |
| H | L | L | H | H | L | L | L | V0 |
| H | L | H | L | L | L | H | L | V3 |
| H | L | H | H | L | L | L | H | V5 |
| H | H | L | L | H | L | L | L | V0 |
| H | H | L | H | L | L | L | H | V5 |
| H | H | H | L | L | L | L | H | V5 |
| H | H | H | H | H | L | L | L | V0 |

Figure 7:
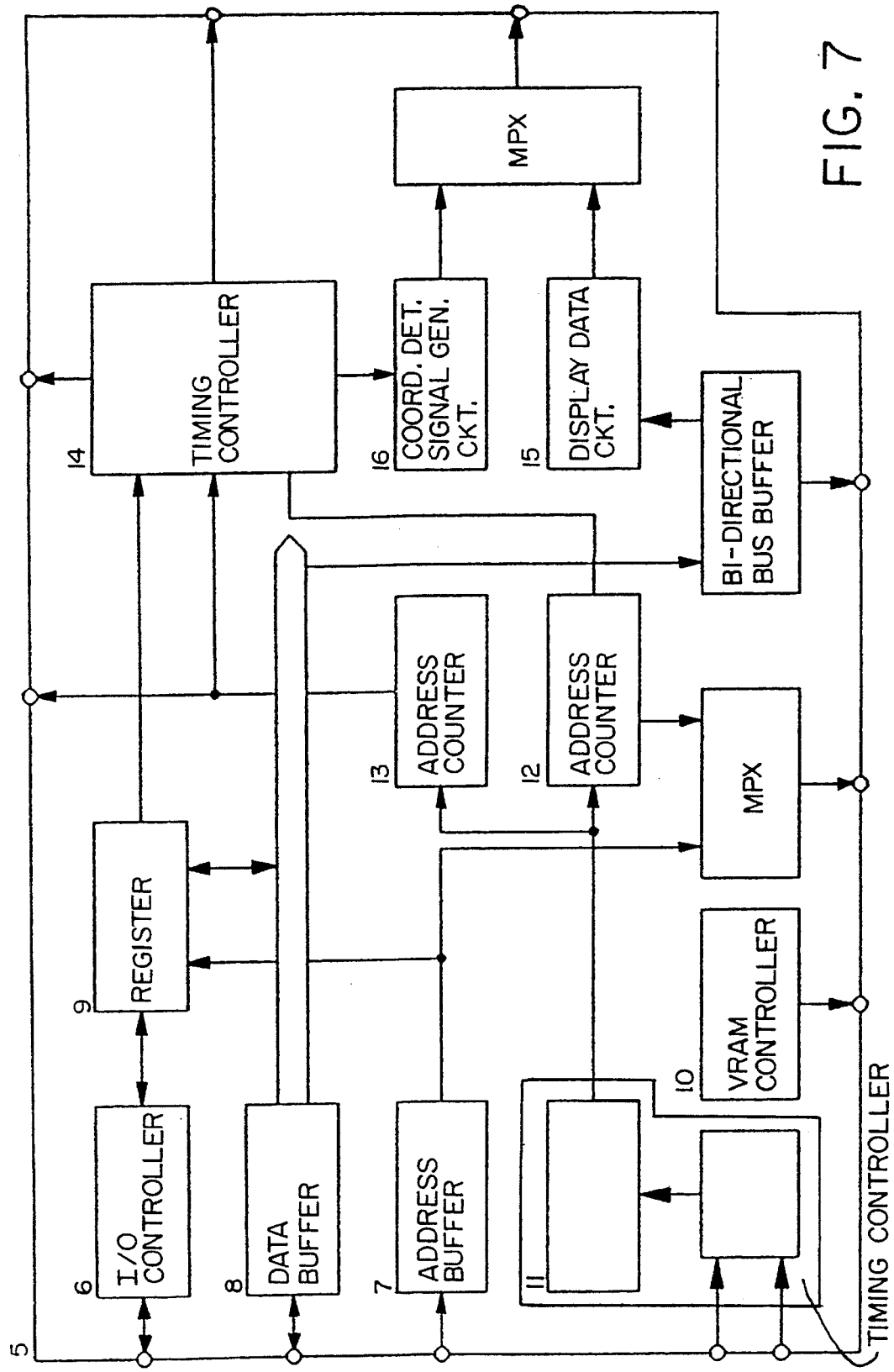
FIG. 7 is a structural view of an LCD controller according to the present invention.

FIG. 7 is a block diagram showing the structure of the LCD controller 5. The components and their functions of the LCD controller 5 are as follows: An input/output controller 6 controls the transmission of data from/to the CPU 1. An address buffer 7 and a data buffer 8 are connected to an address bus and a data bus, respectively. A register 9 is used to set conditions such as the range of display data supplied to a timing controller 14 through the data buffer 8. A VRAM controller 10 controls the VRAM 3. A timing generating circuit 11 generates a basic clock. An address counter 12 produces an address for the VRAM 3, and an address counter 13 produces coordinate data. A timing controller 14 controls a coordinate detection signal generating circuit 16 and the LCD module 17. A display data producing circuit 15 produces display data to be supplied to the LCD panel 18 based on the data from the VRAM 3 through bi-directional bus buffers. The coordinate detection signal generating circuit 16 generates a coordinate detection driving signal for driving the LCD panel 18.

Figure 8:
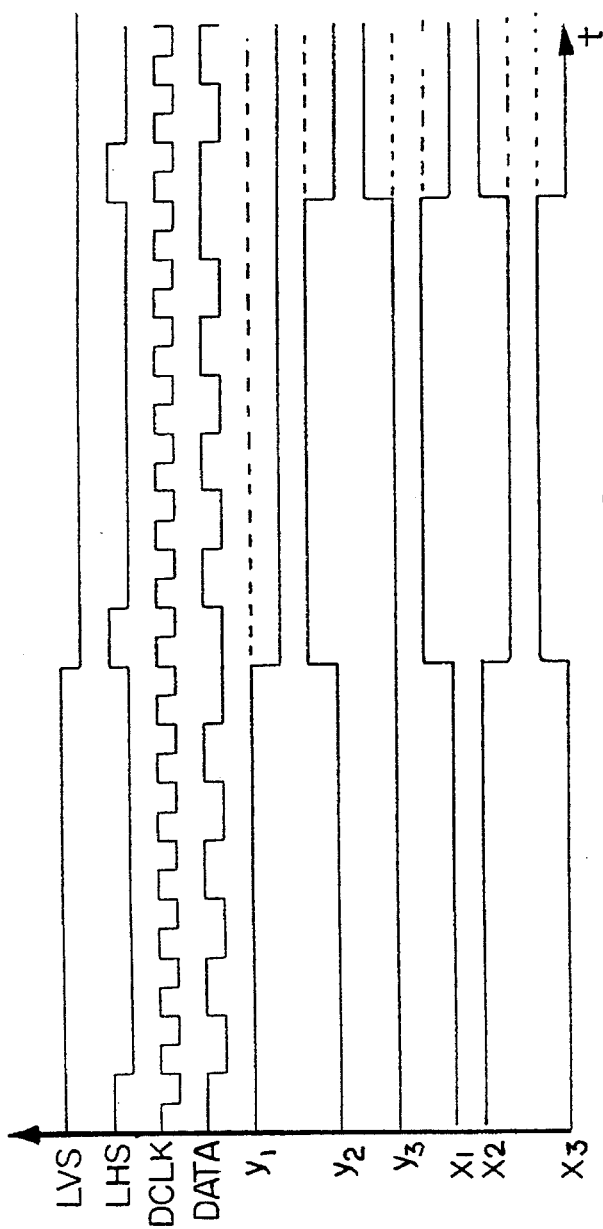
FIG. 8 is a timing chart showing the operation of the LCD controller in the display operation according to the present invention.
Figure 9:
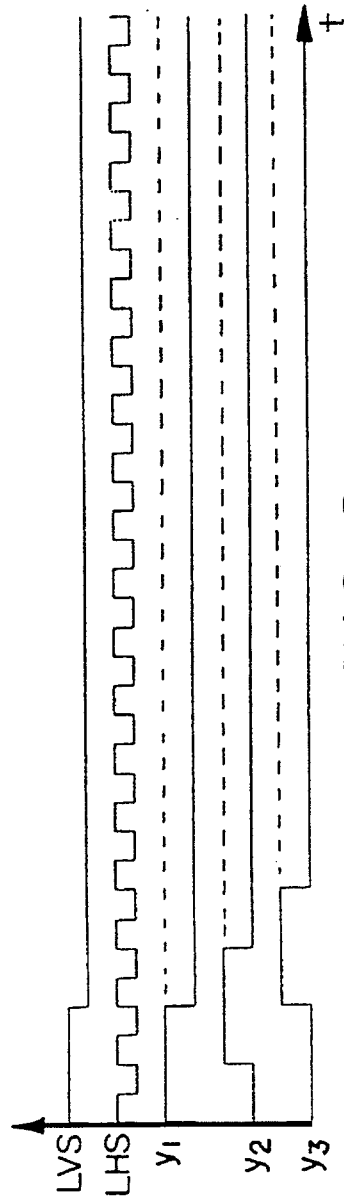
FIG. 9 is a timing chart in the row coordinate detection operation according to the present invention.
Figure 10:
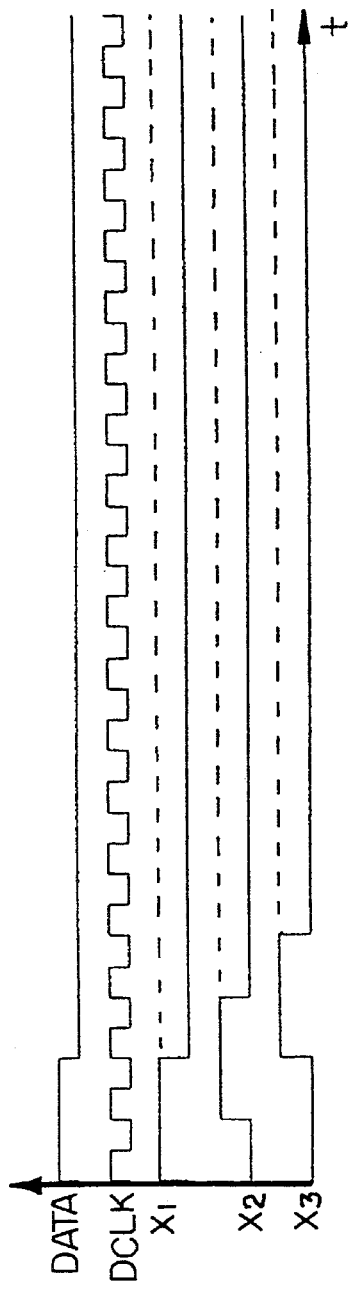
FIG. 10 is a timing chart in the column coordinate detection operation according to the present invention.

FIGS. 8 to 10 are timing charts of signals output from the LCD controller 5 of the above configuration to the row electrode driving circuit 22 and the column electrode driving circuit 23 during a normal display period, a row coordinate detection period, and a column coordinate detection period, respectively. In these figures, LVS and LHS denote the input data and the clock to the row electrode driving circuit 22, respectively. DATA and DCLK denote the input data and the clock to the column electrode driving circuit 23, respectively. FIG. 8 shows the potentials at the electrodes yn and xn during the normal display period. During this period, the AC converted signals M (not shown) input to the level shifters 29 of both the row electrode driving circuit 22 and the column electrode driving circuit 23 are inverted at a cycle of 13 LHS's, for example, so as to prevent direct current from being applied to the liquid crystal.

FIG. 9 shows the signals output from the LCD controller 5 during the row coordinate detection period. Though not shown in FIG. 9, the input data DATA supplied to the column electrode driving circuit 23 is kept in level L and the clock DCLK is the same as the clock LHS. With the above signals supplied, the resultant potentials at the row electrodes yn are as shown in FIG. 9. The AC converted signal M (not shown) has the cycle of 13 LHS's or 13 frames, i.e., the polarity is inverted every 13 LHS's or 13 frames. This cycle is continued from the display period preceding the coordinate detection periods.

FIG. 10 shows the signals output from the LCD controller 5 during the column coordinate detection period. Though not shown in FIG. 10, the input data LVS supplied to the row electrode driving circuit 22 is kept in level L and the clock LHS is the same as the clock DCLK. With the above signals supplied, the resultant potentials at the column electrodes xn are as shown in FIG. 10. The AC converted signal M (not shown) has the cycle of 13 frames. This cycle is continued from the display period preceding the .coordinate detection periods.

Figure 11:
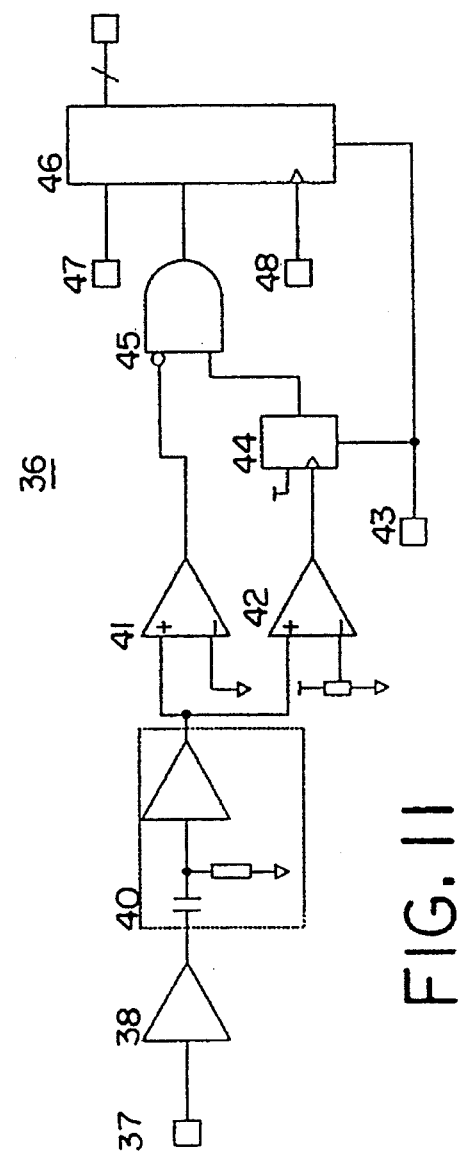
FIG. 11 is a structural view of a coordinate detection circuit according to the present invention.

FIG. 11 shows a configuration of the coordinate detection circuit 36. The voltage signal obtained through the capacitance Ca between the electrode 19 for driving the LCD panel 18 and the finger is received by the input pad 37 through the human body. The signal is then supplied to a differentiating circuit 40 through a voltage follower 38. The differentiating circuit 40 then outputs a signal of which intensity is highest when the variation of the signal received from the voltage follower 38 is maximum. The differentiating circuit 40 is set to output a signal 0 when the potential of the signal is the peak. Comparators 41 and 42 are connected to the output terminal of the differentiating circuit 40. The comparator 41 compares the potential of the signal output from the differentiating circuit 40 with GND, and the result is inverted before being input to an AND circuit 45. The output of the comparator 41 is unstable due to a noise when no signal is supplied thereto. In order to prevent the coordinate detection from being affected by this unstable condition, the comparator 42 is disposed to compare the potential of the signal output from the differentiating circuit 40 with a predetermined potential. The output from the comparator 42 is also input to the AND circuit 45 through a D flipflop 44. The D flipflop 44 is connected to a reset input terminal 43 through which a reset signal is input to the D flipflop 44 to set the output of the D flipflop 44 to level L at the start of the coordinate detection operation. The reset signal is simultaneously input to a counter 46 which counts the coordinate value. Upon receipt of the reset signal, the counter 46 clears the present coordinate value and starts incrementing the coordinate value in accordance with the clock input thereto through a clock input terminal 48. Subsequently, when the coordinate detection operation starts, the differentiating circuit 40 outputs a signal to the comparators 41 and 42. The comparator 42 compares the level of the signal from the differentiating circuit 40 with a predetermined potential. When the level of the signal from the differentiating circuit 40 exceeds the predetermined potential, the level of the output from the comparator 42 turns to H from L. With this change, the level of the output of the D flipflop 44 turns to H from L. As a result, the AND circuit 45 outputs a signal inverted from the signal output from the comparator 41 to the counter 46. Upon receipt of the signal from the AND circuit 45, the counter 46 stops incrementing the coordinate value, and outputs the present coordinate value as the coordinate value at the position on the LCD panel 18 pressed with the finger. The output coordinate value is temporarily stored in a buffer and transmitted to the CPU 1 when the entire coordinate detection operation is completed.

With the above-described configuration of the coordinate detection circuit 36, the coordinate can be detected by monitoring the signal transmitted through the capacitance between the electrode of the LCD panel 18 and the finger 57 and through the human body to be received by the input pad 37.

The input pad 37 should be made of electrically conductive material disposed on a portion of the apparatus which can contact with a portion of the human body other than the hand used for pressing the LCD panel 18. For example, the input pad 37 may be attached to a non-conductive material such as a plastic case covering the body of the apparatus. Alternatively, the conductive input pad 37 may be covered with a non-conductive material so as to keep any portion of the human body from the direct contact with the input pad 37, and a signal transmitted through a capacitance between a portion of the human body and the input pad 37 may be received through the human body by the coordinate detection circuit. In this case, since it is considered that a high pass filter (HPF) is between the electrode of the LCD panel 18 and the input pad 37, a high frequency signal of approximately 3 MHz, for example, may be used as the signal for driving the LCD panel 18. The coordinate of the position pressed by the finger may be detected based on the level of the signal obtained, as described in Japanese Laid-Open Patent Publication No. 61-60117.

When the LCD panel 18 is pressed by the finger, an alignment film formed in the LCD panel 18 may be defected. To prevent this problem, a protective plate called a clearance made of glass or acrylic resin, for example, is generally disposed on the LCD panel 18. In practice, therefore, the capacitance between the electrode and the finger when the general LCD panel 18 is pressed with the finger is very small, that is, the value of Ca in Equation (2) is very small. Therefore, the potential of the signal at the input pad 37 after the transmission through the human body is very small.

Some measures should be taken, therefore, to obtain a signal having a potential greater than the potential N of a noise which may enter the signal during the transmission through the human body.

Figure 12:
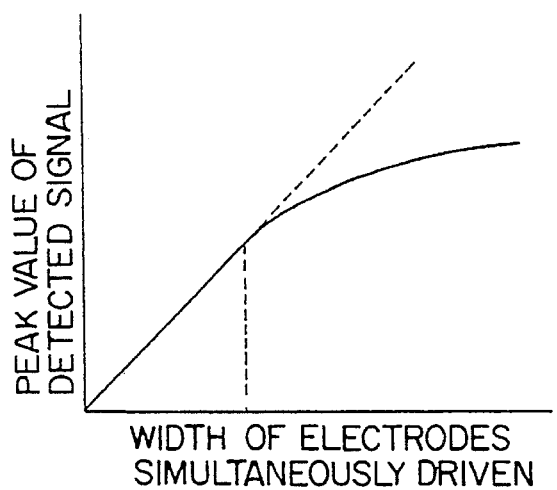
FIG. 12 is a graph showing the relationship between the number of electrodes simultaneously driven and the intensity of the detected signal.

The measures adopted in this example are to increase the potential of the signal to be input to the coordinate detection circuit 36 by increasing the number of electrodes which are simultaneously driven. FIG. 12 shows the relationship between the intensity of the signal obtained by pressing the LCD panel 18 with the finger and the width of the area corresponding to the electrodes which are simultaneously driven. As is apparent from FIG. 12, as the number of electrodes which are simultaneously driven and thus the width of the area corresponding to the electrodes increase, the amplitude of the signal obtained and thus the intensity thereof increase. However, when too many electrodes are simultaneously driven, the resolution of the coordinate detection as well as the precision thereof decrease. Therefore, the number of electrodes which are simultaneously driven should be appropriately determined.

Figure 13:
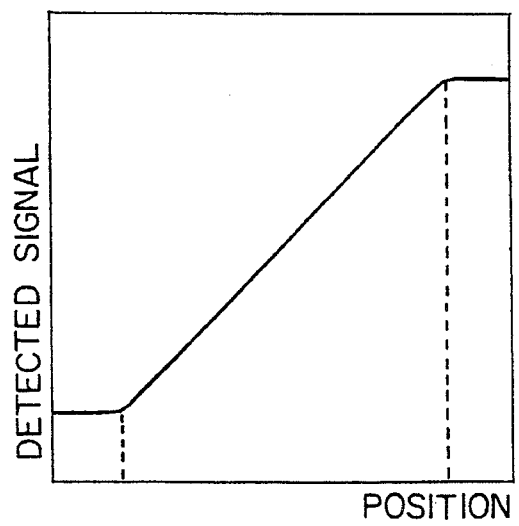
FIG. 13 is a graph showing the relationship between the number of electrodes simultaneously driven and the precision of detection.

FIG. 13 shows the variation in the peak level of the signal obtained when every 16 of total n electrodes are sequentially driven so that 16 electrodes are always simultaneously driven. As is apparent from FIG. 13, in the areas corresponding to the first eight electrodes from the respective ends of the LCD panel 18, the peak level of the signal detected through the capacitance between the electrode and the finger is constant whatever position in the area is pressed with the finger. Thus, according to the coordinate input device of this example, when every m of the total n electrodes are sequentially driven so that m electrodes are simultaneously driven, the peak level of the signal obtained is constant, i.e., a dead band is formed, in the area corresponding to the first m/2 electrodes from the respective ends of the LCD panel 18 whichever position in the area is pressed with the finger. In consideration of the above, the number m of electrodes which are simultaneously driven should be appropriately determined so that a signal with a sufficiently high intensity and a detection precision required for the coordinate detection can be ensured. For example, m is determined in consideration of the width of the finger, i.e., approximately 1 cm.

As described above, by driving every m of the total n electrodes so that m electrodes are simultaneously driven, a sufficiently high level of signal can be obtained. For example, the coordinate input device of this example has 480 row electrodes and 320 column electrodes for driving the LCD panel 18 having a size of 144 mm×96 mm. A sufficiently high level of signal for the coordinate detection can be obtained by simultaneously driving 32 electrodes. This allows for the coordinate detection with high precision even when the position is pressed with the finger.

The coordinate input device of this example may be additionally provided with a function of the coordinate input with a detective pen. A higher resolution is required for the coordinate input with the detective pen than with the finger. Accordingly, when the detective pen is used, the number of electrodes which can be simultaneously driven is limited, compared with when the finger is used. When both the detective pen and the finger are used for the same coordinate input device, therefore, two coordinate input periods for the detective pen and the finger should be separately provided. In the detective pen input period, the number of electrodes which are simultaneously driven is made smaller than that in the finger input period. The detective pen may be provided with a switch for switching the coordinate input period with the detective pen to the coordinate input period with the finger or vice versa. When the switch is on, the coordinate input with the pen is allowed. When the switch is off, the coordinate input with the finger is allowed. By such measures, a sufficiently high level of signal for the coordinate detection can be obtained whichever of the detective pen and the finger is used for the coordinate input, allowing for coordinate detection with high precision.

According to the above-described method, it is possible to obtain a sufficiently high level of signal transmitted from the row electrodes y1, y2, ..., yn which are disposed on the front substrate of the LCD panel 18 through the finger. However, it is difficult to obtain a signal with the same level from the column electrodes x1, x2, ..., xn disposed on the back substrate of the LCD panel 18 since 90% of the column electrodes x1, x2, ..., xn are covered with the row electrodes y1, y2, ..., yn.

Figure 14:
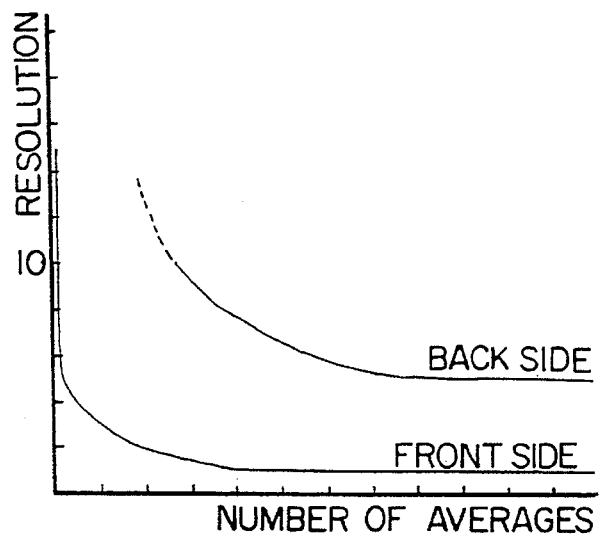
FIG. 14 is a graph showing the relationship between the number of detection operations and the resolution.

In order to obtain a signal with a sufficiently high intensity from the column electrodes x1, x2, ..., xn, the detection of the signal can be repeated several times to obtain an average value. By this procedure, noise can be removed from the signal. FIG. 14 shows the relationship between the number of repeated detection operations and the resolution. As is apparent from FIG. 14, the resolution and the precision of the detection can be improved by increasing the number of repeated detection operations.

Figure 15:
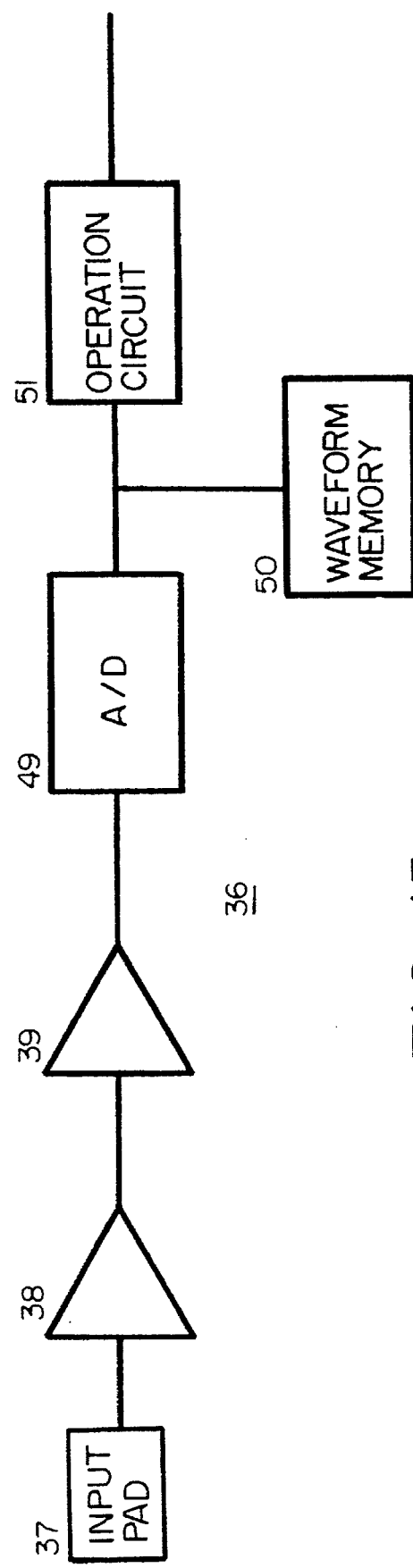
FIG. 15 is a structural view of another coordinate detection circuit according to the present invention.

FIG. 15 shows an example of the coordinate detection circuit 36 having a function of averaging. The voltage follower 38 outputs a voltage signal obtained through the input pad 37. An A/D converter 49 converts the signal to a digital value, whose waveform value is temporarily stored in a waveform memory 50. An operation circuit 51 calculates an average of a plurality of waveform values stored in the waveform memory 50, detects a peak position of the signal, and then converts the peak position to a coordinate value. The coordinate value is finally output from the coordinate detection circuit 36.

Figure 16:
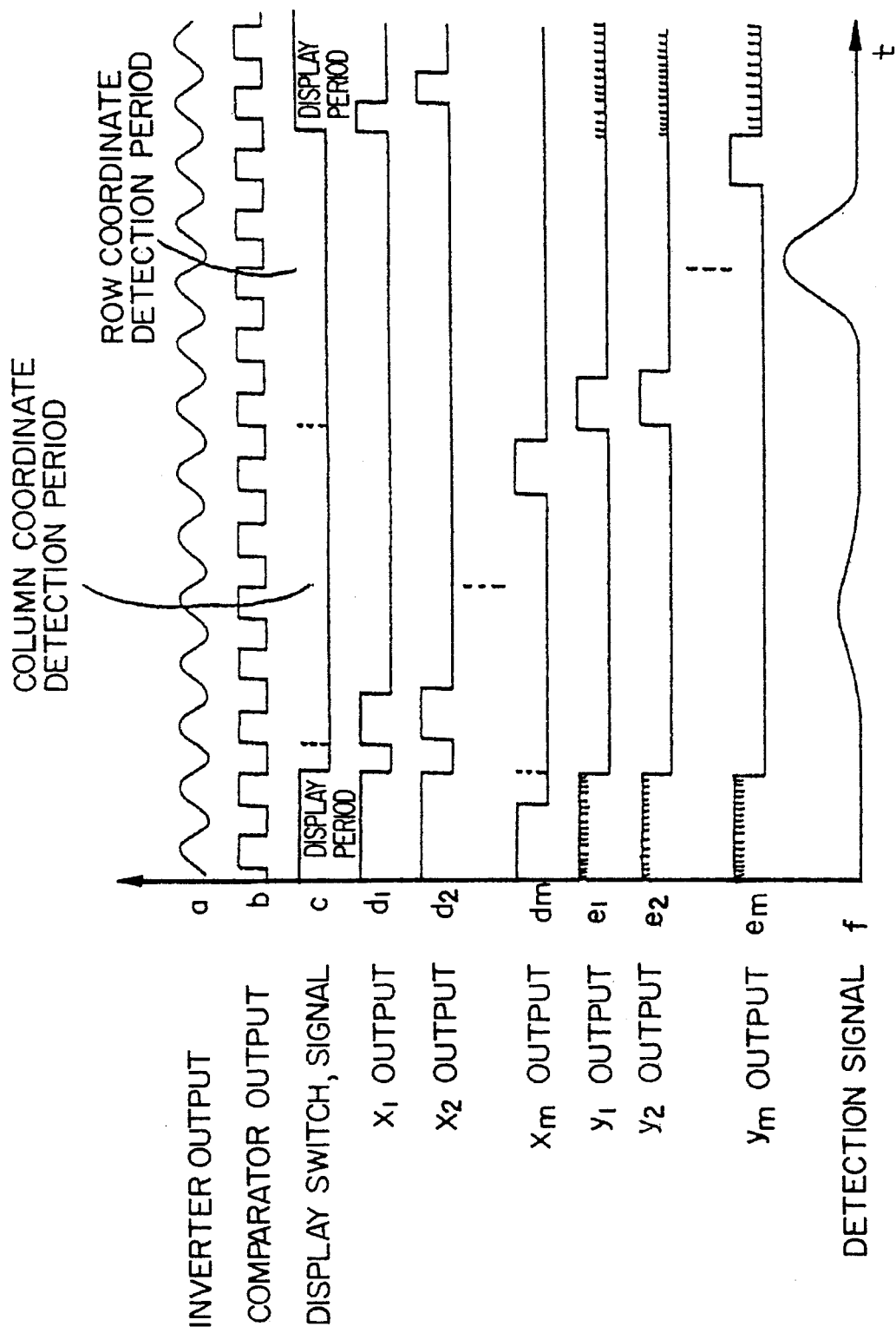
FIG. 16 is a timing chart showing the operation of a modified coordinate input device of Example 1 according to the present invention.

FIG. 16 shows waveforms used in the coordinate input device having the above coordinate detection circuit 36. The speed at which the coordinate input is detected, or the detection speed, is not required to be high when the coordinate is input with the finger, compared with when it is input with the detective pen. Therefore, in this example, as shown in the timing chart of FIG. 16, each one of the row coordinate detection and the column coordinate detection is conducted for one frame of the display operation, and the average of a plurality of frames is calculated as one coordinate value. Such a detection speed is sufficient for practical use. However, it is also possible to repeat a plurality of coordinate detection operations in one frame.

With the above-described coordinate detection circuit having a function of averaging a plurality of detected signals, any noise generated in the human body can be minimized, and thus a signal with a sufficiently high intensity for the coordinate detection can be obtained.

As described earlier, when both the detective pen and the finger are used for the same coordinate input device, two coordinate input periods for the detective pen and the finger should be separately provided. In the detective pen input period, the number of electrodes which are simultaneously driven is made smaller than that in the finger input period. Alternatively, the detective pen may be provided with a switch or the like to distinguish the detective pen input period from the finger input period. When the switch is on indicating the use of the detective pen, the number of electrodes which are simultaneously driven is reduced, while it is increased when the switch is off indicating the use of the finger.

EXAMPLE 2

In Example 1, the precision of the coordinate detection is improved by averaging a plurality of detected signals. However, this may result in the reduction of the speed of the coordinate detection.

Figure 17:
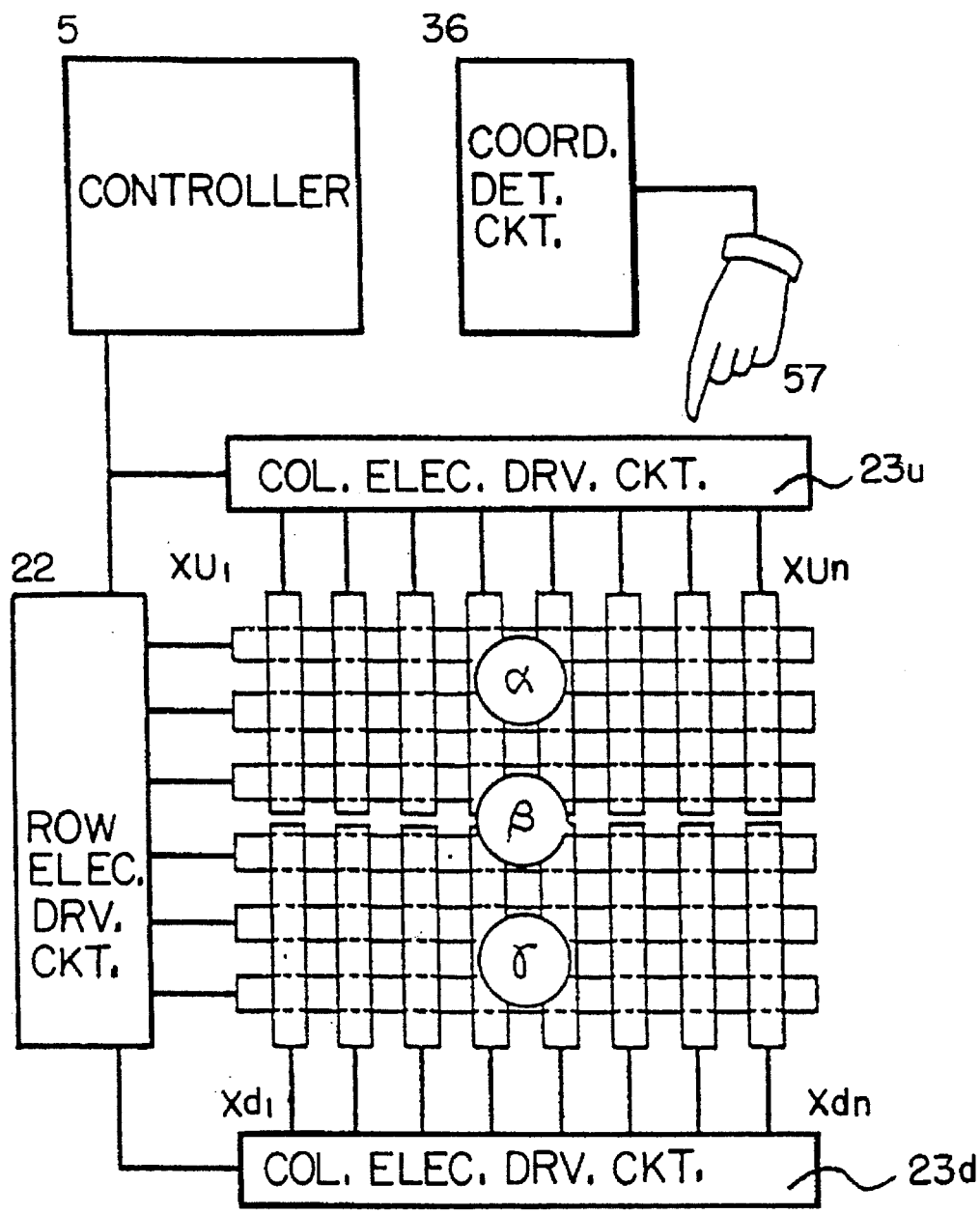
FIG. 17 is a structural view of an LCD module of a second example of the coordinate input device according to the present invention.

Various methods for increasing the speed of the coordinate detection are proposed. One example is to use only the electrodes on the front substrate of the LCD panel and still to achieve a two-dimensional coordinate input. The speed of the coordinate detection can be higher than when the electrodes on both the front and back substrates of the LCD panel are used. An information apparatus incorporating a coordinate input device using such a method will be described as a second example of the present invention as follows:

FIG. 17 is a block diagram showing a main portion of the coordinate input device of this example used for an information apparatus. The coordinate input device of this example has similar components to those of Example 1 except that two column electrodes with an identical length are arranged in each column and two column electrode driving circuits $23u$ and $23d$ are disposed. The column electrode driving circuit $23u$ supplies a driving signal to column electrodes $xu_1, xu_2, \ldots, xu_n$ (column electrodes in the upper part as is seen in FIG. 17) and the column electrode driving circuit $23d$ to column electrodes $xd_1, xd_2, \ldots, xd_n$ (column electrodes in the lower part as is seen in FIG. 17). In this example, these column electrodes are disposed on the front substrate of the LCD panel so that they are on the front side of the information apparatus. The column electrode driving circuits $23u$ and $23d$ and the row electrode driving circuit 22 are controlled by the LCD controller 5 as in Example 1.

The display operation of this information apparatus is the same as that described in Example 1, and therefore the description thereof is omitted.

The coordinate detection operation of this information apparatus will be described taking the input with the finger as an example. The column coordinate value is determined by scanning the column electrodes disposed on the front substrate and detecting the signal transmitted through the capacitance between the column electrode portions and the finger 57 to the input pad 37. At this time, the potential at the row electrodes $Y_1, Y_2, \ldots, Y_n$ is fixed to an appropriate value. More specifically, when a driving pulse is supplied to the column electrodes, the potential at the column electrodes changes. The change of the potential at the electrodes corresponding to the position pressed with the finger is transmitted through the human body to the input pad 37 and enters the coordinate detection circuit 36. The coordinate detection circuit 36 detects the peak position of the potential of the signal input thereto, thus determining the column coordinate value indicating the position pressed with the finger, as in the procedure described in Example 1.

Figure 18:
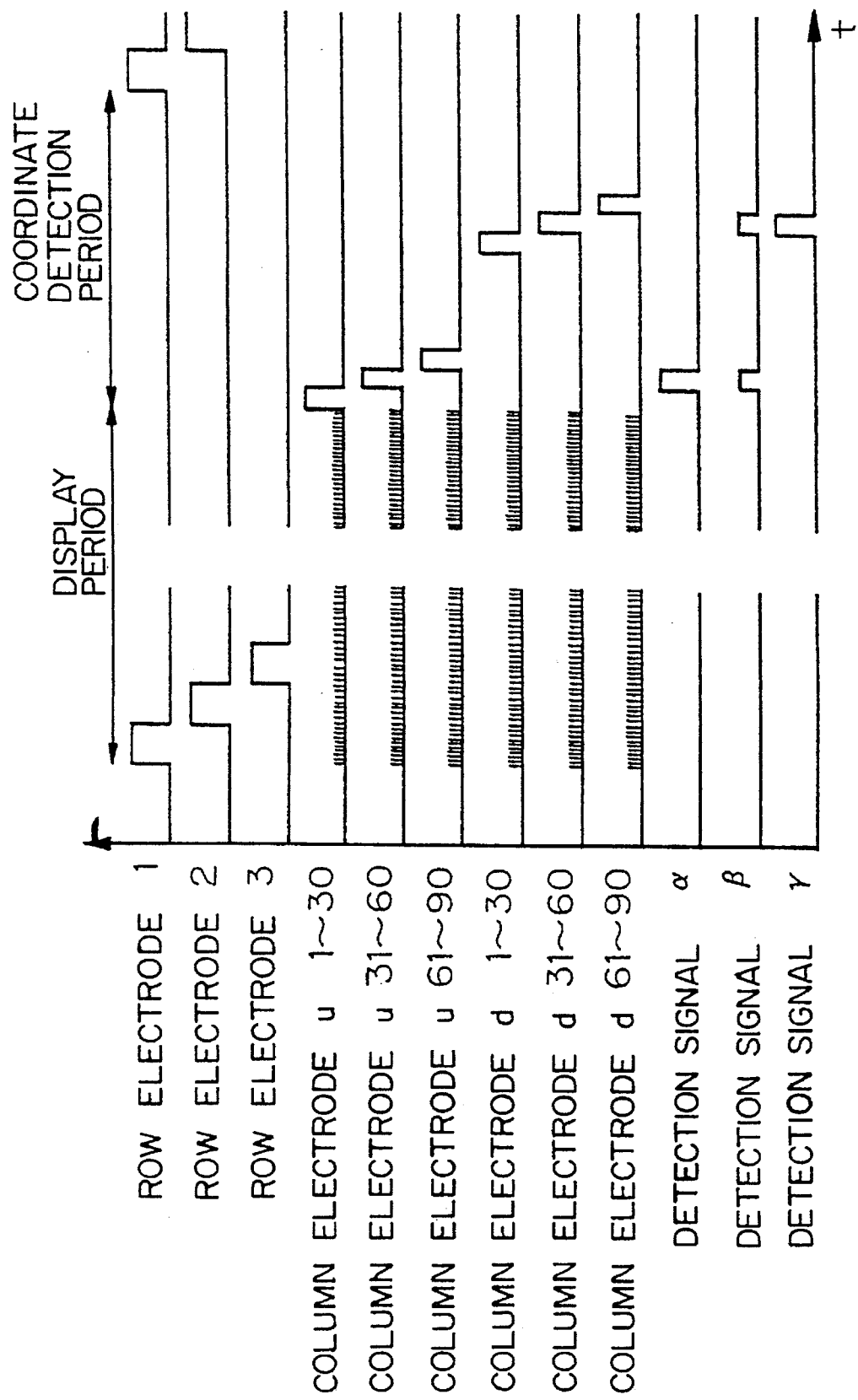
FIG. 18 s a timing chart showing the operation of a coordinate detection circuit of the second example according to the present invention.

The row coordinate value is determined by supplying a driving signal to the column electrode portions $xu_1, xu_2, \ldots, xu_n$ in the upper part and the column electrode portions $xd_1, xd_2, \ldots, xd_n$ in the lower part by time sharing and by detecting the signal, while the potential at the row electrodes $Y_1, Y_2, \ldots, Y_n$ is fixed to an appropriate value. This will be described in more detail referring to FIG. 18. When the column electrodes are driven as shown in FIG. 18, and the finger 57 presses positions α, β, and γ on the LCD panel 17 (see FIG. 17), the detected signals are α, β, and γ, respectively, as shown in FIG. 18. When the finger presses somewhere in the upper part of the LCD panel (as is seen in FIG. 17), the signal is obtained by supplying a driving signal to the column electrode portions $xu_1, xu_2, \ldots, xu_n$ in the upper part. When the finger presses somewhere in the lower part of the LCD panel (as is seen in FIG. 17), the signal is obtained by supplying a driving signal to the column electrode portions $xd_1, xd_2, \ldots, xd_n$ in the lower part. When the finger 57 presses the center part of the LCD panel, the signal is obtained by supplying a driving signal to either upper or lower column electrode portion. The signal transmitted through the finger 57 is input to the coordinate detection circuit 36 through the input pad 37, and the row coordinate value is determined based on the peak position of the signal, as described in Example 1. In this way, the row coordinate value can be determined by using only the column electrodes, though the resolution thereof is low.

Thus, according to this example, the coordinate input device in which the speed of coordinate detection is increased can be achieved though the resolution of the row coordinates thereof is low. This coordinate input device is suitable for a device not requiring a significantly high resolution, such as a push-button telephone and a device for inputting a simple menu selection.

As described above, according to this example, the row electrodes or the Column electrodes are divided into two portions, and the electrodes having divided electrode portions are disposed on the front substrate of the LCD panel. A driving signal is supplied to the two electrode portions by time sharing. By this method, the two-dimensional coordinate detection is possible by using only the electrodes disposed on the front substrate of the LCD panel which can provide a signal with high intensity, without using the electrodes disposed on the back substrate of the LCD panel which provide a signal with low intensity. As a result, a coordinate input device in which the coordinate input can be performed at high speed can be obtained.

EXAMPLE 3

As described above, the coordinate input device of Example 2 can improve the speed of the coordinate detection. However, this coordinate input device produces a large difference in luminance in the center portion of the LCD panel because each of the column electrodes is divided into two portions with an identical length. This problem can be solved by dividing the column electrode into portions with different lengths as shown in FIG. 19.

Figure 19:
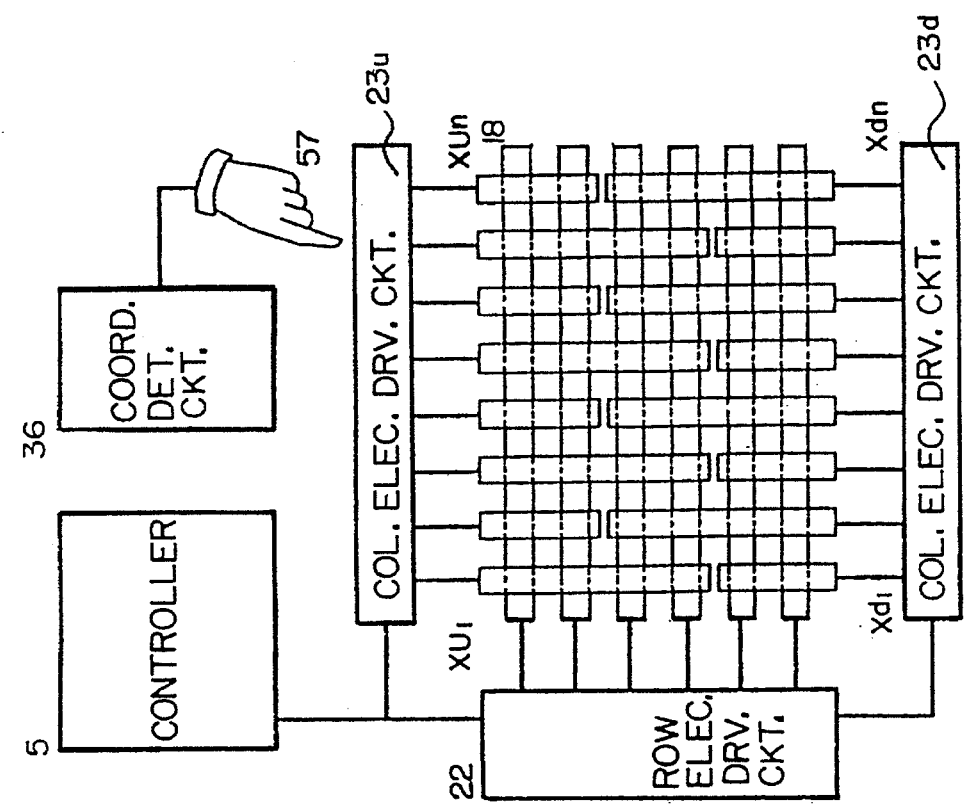
FIG. 19 s a structural view of an LCD module of a third example of the coordinate input device according to the present invention.

FIG. 19 is a block diagram showing a main portion of a third example of the coordinate input device of the present invention. The coordinate input device of this example has similar components to those of Example 2, except that each of the column electrodes is composed of two column electrode portions with different lengths and that these portions of different lengths are alternately disposed. As shown in FIG. 19, the longer electrode portions are disposed at odd columns in the upper part ( electrode portion $xu_1$, for example) and at even columns in the lower part (electrode portion $xd_2$, for example), while the shorter electrode portions are used at even columns in the upper part (electrode portion $xu_2$, for example) and at odd columns in the lower part (electrode portion $xd_1$, for example). According to this arrangement, the column electrode portions in the upper part and those in the lower part are alternately disposed in the middle portion of the LCD panel along the row direction. Thus, the signal can be obtained by driving any of the upper and lower parts of electrode portions.

By alternately disposing two types of column electrode portions of different lengths as described above, it is possible to form a center portion on the LCD panel having a desired size where the signal can be obtained by driving any of the upper and lower parts of the column electrode portions. Further, the gap portions between the column electrode portions of the column electrodes are not lined, but positioned in a zigzag fashion. Accordingly, the difference in luminance in the row direction of the LCD panel can be prevented.

As in Example 2, the row electrodes, instead of the column electrodes, may be divided into two portions and disposed on the front substrate of the LCD panel, so as to obtain the same effects as those described above.

EXAMPLE 4

In Example 2, each of the column electrodes are divided into two portions with an identical length, and in Example 3, each of the two column electrodes are divided into two portions with different lengths. The resolution in the row coordinate detection can be further improved by increasing the number of types of the column electrode portions with different lengths.

Figure 20:
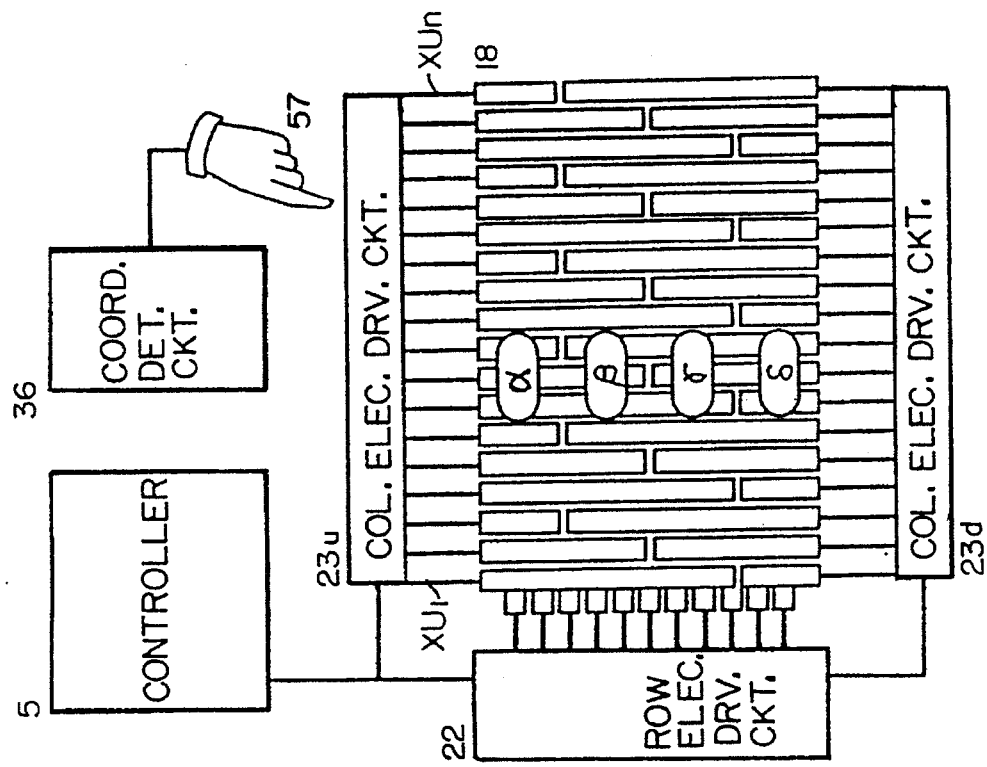
FIG. 20 s a structural view of an LCD module of a fourth example of the coordinate input device according to the present invention.

FIG. 20 is a block diagram showing a main portion of a fourth example of the coordinate input device of the present invention. The coordinate input device of this example has components similar to those of Examples 1 to 3, except that three types of column electrode portions with different lengths are used. These three types of electrode portions are arranged in order as shown in FIG. 20. With this arrangement, an area on the LCD panel, for example, covers three column electrode portions in the upper part but no column electrode portions in the lower part. When the area is pressed with the finger, the ratio of the intensity of the signal obtained by applying a driving signal to the column electrode portions in the upper part to that of the signal obtained by applying a driving signal to the column electrode portions in the lower part is 3:0. Likewise, the ratio of the intensity of the signal obtained when each of areas $\beta, \gamma$, and $\delta$ is pressed with the finger is shown in Table 3.

TABLE 3

| | Signal intensity obtained by driving: | |
| --- | --- | --- |
| | Upper column electrode portions | Lower column electrode portions |
| $\alpha$ | 3 | 0 |
| $\beta$ | 2 | 1 |
| $\gamma$ | 1 | 2 |
| $\delta$ | 0 | 3 |

Thus, plural types of column electrodes with different lengths can be arranged in order in the LCD panel. Two signals are detected by applying a driving signal to the column electrode portions in the upper part and in the lower part separately, and the ratio of the intensities of the signals is calculated. The row coordinate value is determined based on the calculated ratio of the intensity. In this way, the resolution of the row coordinate value can be improved.

EXAMPLE 5

As described in Examples 2 to 4, the speed of the coordinate detection can be increased by dividing each of the column electrodes into two portions which are disposed on the front substrate of the LCD panel. Such a structure is however disadvantageous in that an increased number of column electrode driving circuits are required to drive these column electrode portions or the configuration of the column electrode driving circuit becomes complicated. A fifth example of the coordinate input device of the present invention overcomes this disadvantage.

Figure 21:
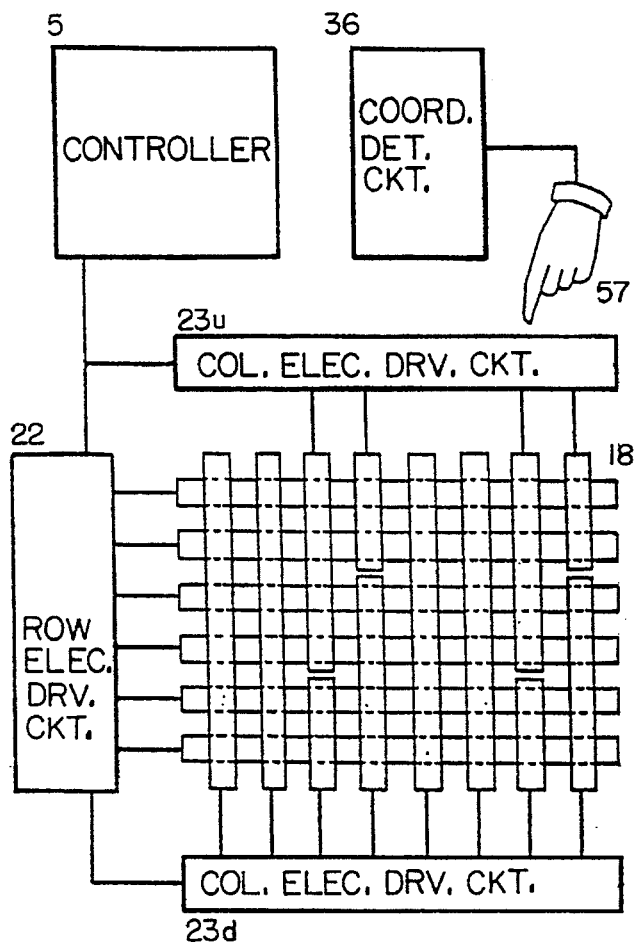
FIG. 21 s a structural view of an LCD module of a fifth example of the coordinate input device according to the present invention.

FIG. 21 is a block diagram showing a main portion of this example. In the coordinate input device of this example, some of the column electrodes disposed where high precision is required are composed of two electrode portions, while others are composed of single continuous electrodes. This arrangement is possible without reducing the precision of the coordinate detection because of the following reasons: The width of the finger is substantially constant, not varying at every coordinate input. Also, a high precision is not required for the coordinate input with the finger. Moreover, since the resolution of the row coordinate value is low, a significantly high resolution is not necessary for the column coordinate value. By this arrangement, it is possible to reduce the number of column electrode driving circuits or to avoid the complication of the column electrode driving circuit. Further, by using the LCD panel having the column electrodes of this arrangement, a coordinate input device allowing the two-dimensional coordinate input with the finger can be realized at relatively low cost.

In this example, the column electrodes are disposed on the front substrate of the LCD panel. However, the row electrodes may be disposed on the front substrate with the arrangement as described above, so as to obtain the same effects as those described for the column electrodes.

EXAMPLE 6

Figure 22:
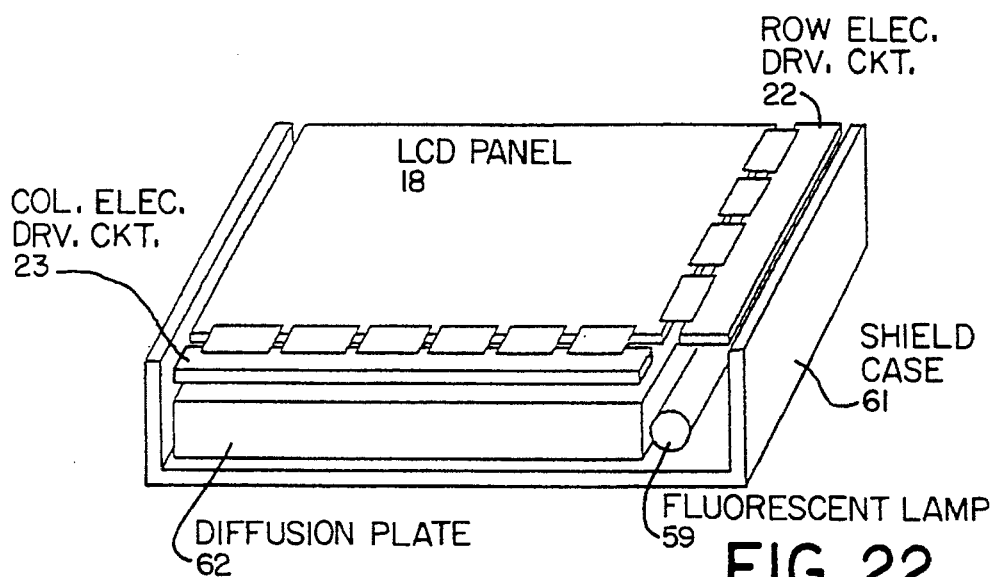
FIG. 22 is a schematic perspective view of an apparatus including a display device with a function of the coordinate detection.

In Examples 1 to 5, the means for preventing random noise such as induced current from affecting the signal for the coordinate detection during the transmission of the signal through the human body has been described. The precision of the coordinate detection is also reduced by noise generated in the device itself. Such noise enters the signal not only when the finger is used to input the coordinate but also when the detective pen which is in electrical connection with the input pad 37 is used. It is especially difficult to prevent a noise generated from a back light from entering the signal since the back light is disposed inside a shield case 61 as shown in FIG. 22. A noise Generated from an inverter is also a problem because the driving frequency of the inverter is several tens of kilohertz which is in the frequency band similar to that of the signal used for the coordinate detection. For this reason, it is difficult to eliminate such a noise by using a filter.

Figure 23:
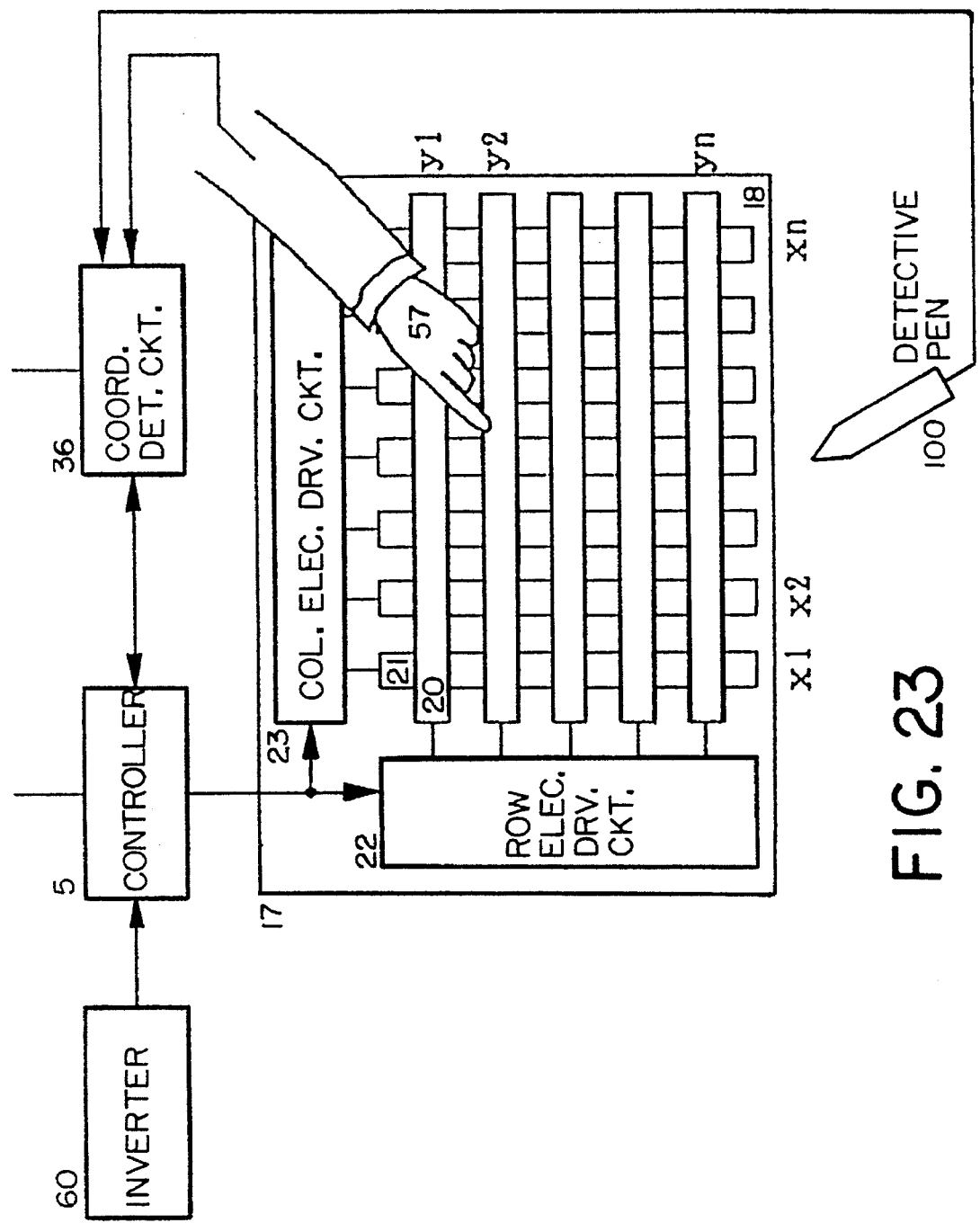
FIG. 23 is a structural view of an LCD module of a sixth example of the coordinate input device according to the present invention.
Figure 24:
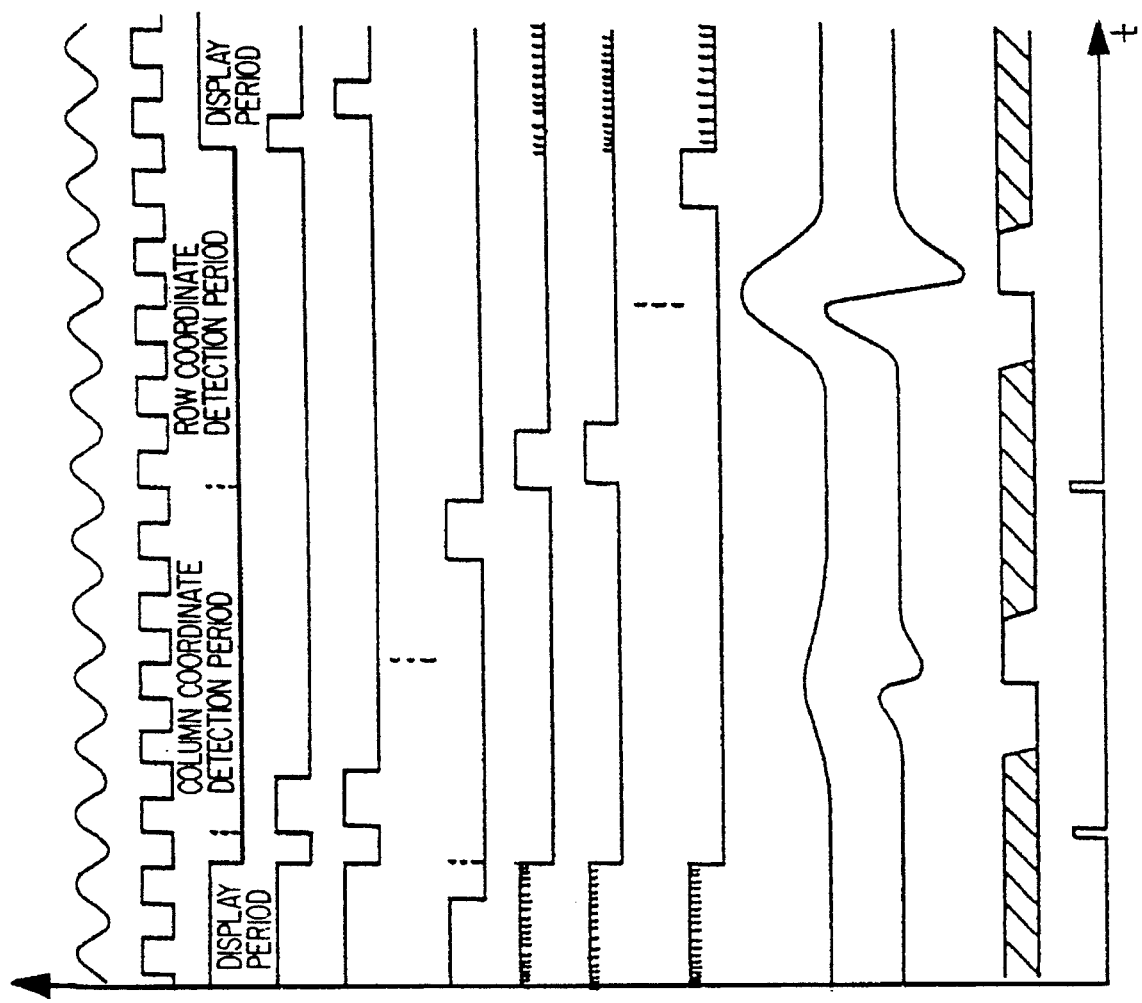
FIG. 24 is a timing chart showing the operation of a coordinate detection circuit of the sixth example according to the present invention.

FIG. 23 is a block diagram showing a main portion of a sixth example of the coordinate input device of the present invention, which can eliminate noises from the back light and the inverter. An LCD module 17 includes an LCD panel 18 having a plurality of row electrodes 20 and a plurality of column electrodes 21, a row electrode driving circuit 22 selectively supplying a voltage to the row electrodes 20, and a column electrode driving circuit 23 selectively supplying a voltage to the column electrodes 21. In the LCD panel 18, the row electrodes 20 and the column electrodes 21 are arranged on different substrates (front and back substrates) which are disposed to face each other so that the row electrode 20 and the column electrodes 21 oppose to each other forming a matrix together. In this example, the row electrodes 20 are arranged on the front substrate. Liquid crystal is contained between the two substrates.

The row electrode driving circuit 22 and the column electrode driving circuit 23 are controlled by the LCD controller 5. The display operation and the coordinate detection operation on the LCD panel 18 are conducted by time sharing. A coordinate detection circuit 36 receives a signal through an input pad 37 (not shown). The signal is transmitted through the capacitance between a finger 57 for effecting the coordinate input and the electrode in the LCD panel 18 and through the human body to the input pad 37. Based on the detected signal, the coordinate detection circuit 36 calculates the coordinate values of the position pressed with the finger. The LCD controller 5 is connected to an inverter 60 which drives a back light 59 (not shown) disposed on the back or on a side of the LCD panel 18. Thus, the coordinate detection operation is controlled by using the output of the inverter 60, which is different from the coordinate input device of Example 1.

The display operation in this example is the same as that in Example 1. The description thereof is therefore omitted. The coordinate detection operation will be described taking the input with the finger as an example.

In the row coordinate detection period, while the potential at the column electrodes 21 is fixed, a scanning pulse is sequentially applied to the row electrodes 20 from the row electrode driving circuit 22 as in the display period. The scanning of the row electrodes 20 is started synchronously with the output of the inverter 60. In the column coordinate detection period, while the potential at the row electrodes 20 is fixed, a scanning pulse is sequentially applied to the column electrodes 21 from the column electrode driving circuit 23. As in the row coordinate detection period, the scanning of the column electrodes 21 is started synchronously with the output of the inverter 60. A scanning start pulse is supplied to the coordinate detection circuit 36 from the LCD controller 5. In the coordinate detection period, as in the display period, the polarity may be inverted every frame in order to prevent the degradation of the liquid crystal due to the application of direct current.

Figure 25:
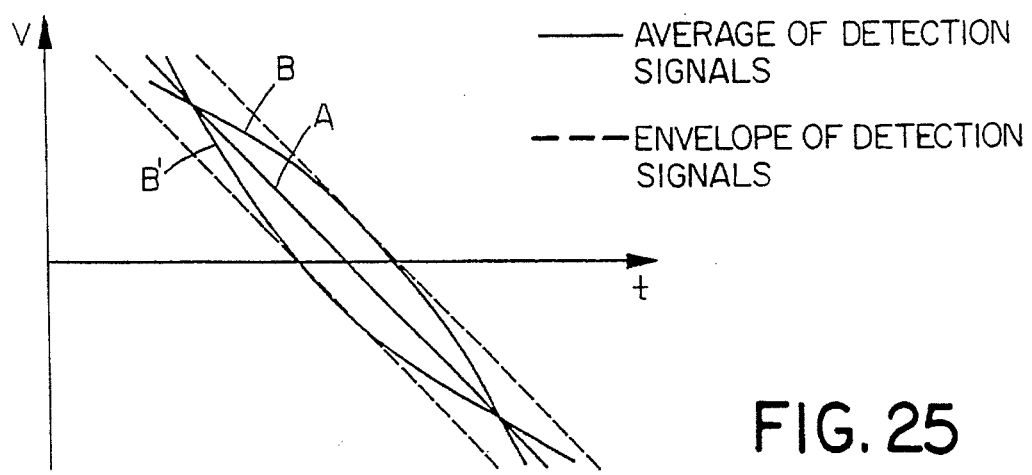
FIG. 25 is a graph showing the signal for the coordinate detection obtained in a conventional coordinate input device.
Figure 26:
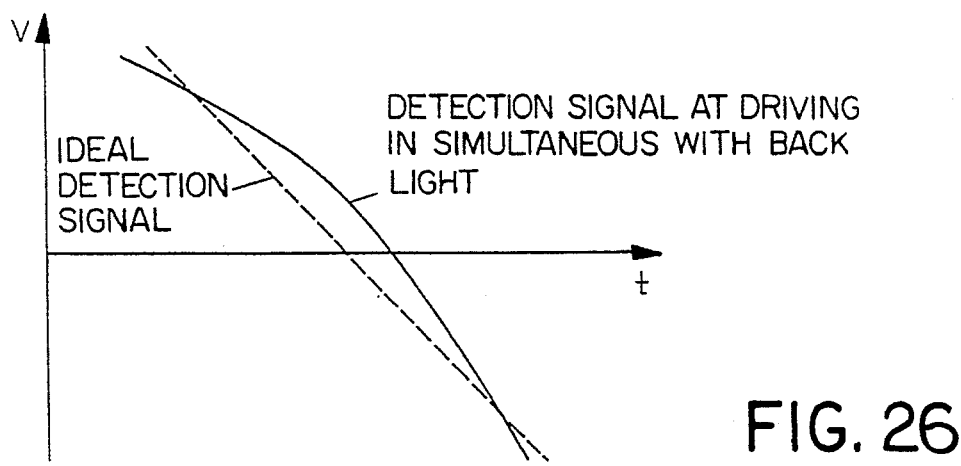
FIG. 26 is a graph showing the signal for the coordinate detection obtained in the sixth example according to the present invention.

The effects obtained by driving the LCD panel as described above during the coordinate detection operations will be described in comparison with the case of using a conventional coordinate input device. FIGS. 25 and 26 show the signals output from a differentiating circuit of the coordinate detection circuit 36, focusing on a portion of the signal at and around a point where the potential is 0. FIG. 25 shows the signal obtained in the conventional coordinate input device. FIG. 26 shows the signal obtained in the coordinate input device of this example. The point where the potential of the signal output from the differentiating circuit is 0 corresponds to the position pressed with the finger on the LCD panel. In the conventional example shown in FIG. 25, the phase of a noise generated from the back light (hereinafter, referred to as a back light noise) is not fixed. Thus, the back light noise having various phases as shown by the solid lines B and B' in FIG. 25 having the average of the signals (ideal output) shown by the solid line A as the center. Accordingly, the envelope of the output of a comparator of the coordinate detection circuit 36 is formed as shown by the dash lines. This indicates that the time when the potential of the output signal is 0 widely varies, resulting in the reduction of the resolution. On the contrary, as shown in FIG. 26, according to this example where the phase of the back light noise is fixed, the phase of the back light noise entering the signal at a certain position is fixed. This indicates that the amount of the back light noise at that position is constant, and thus the reduction of the resolution is prevented.

As described above, by conducting the coordinate detection operations synchronously with the output of the inverter for driving the back light, the reduction of the resolution caused by the back light noise can be prevented.

The electrodes disposed on the front substrate of the LCD panel (the row electrodes in this example) can provide a signal with higher intensity than the electrodes disposed on the back substrate thereof. Therefore, when the coordinate detection is conducted using the signal obtained from the electrodes disposed on the front substrate, the means for reducing the back light noise as described above is not necessary, though it is better to provide such a means.

In this example, the coordinate input with the finger has been described. The improvement in the resolution as described above is also possible for the coordinate input with the detective pen 100.

EXAMPLE 7

Figure 27:
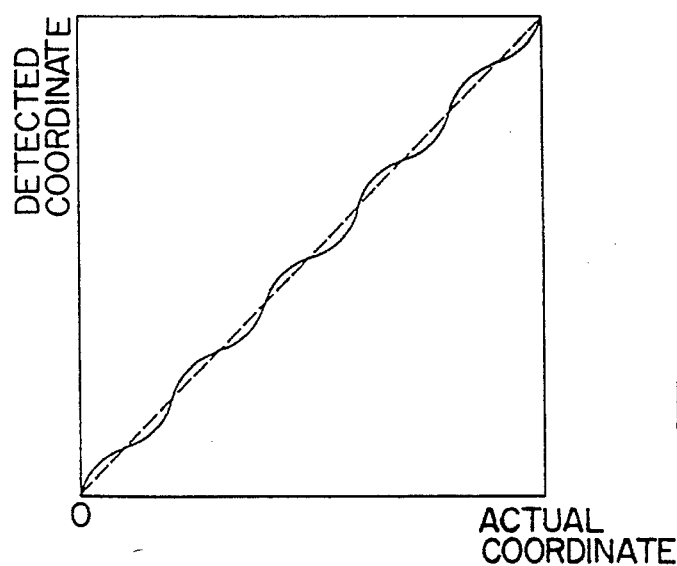
FIG. 27 is a graph showing the correlation between the coordinate of a position indicated by an indicator and the detected coordinate.

In Example 6, in order to reduce the influence of the back light noise on the signal used for the coordinate detection, the phase of the back light noise is fixed, while the level of the back light noise is not lowered. However, the level of the noise at each position on the LCD panel is uniquely determined by the phase of the noise when it enters the signal. Accordingly, when the means for reducing the back light noise as shown in Example 6 is used, a periodical deviation as shown in FIG. 27 is between the coordinate of the position pressed with the finger and the coordinate detected from the signal obtained through the finger. Such a deviation is not critical in practice as far as it is smaller than the resolution of the coordinate input device. However, if the deviation is greater than the resolution, the unconformity between the position pressed on the LCD panel and the position detected and displayed becomes eminent. Such a device cannot be easily used.

Figure 28:
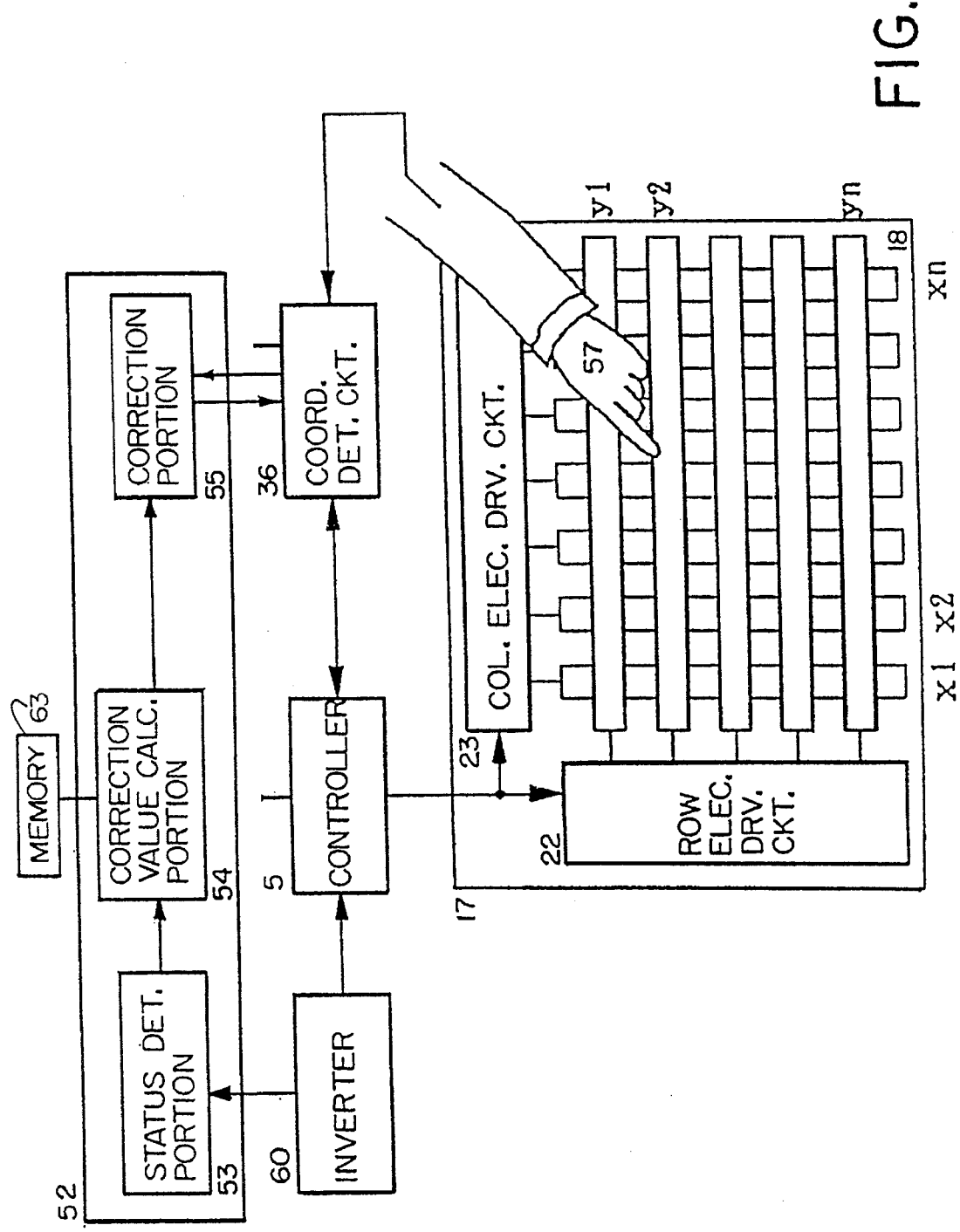
FIG. 28 is a structural view of an LCD module of a seventh example of the coordinate input device according to the present invention, together with a correction circuit.

Referring to FIG. 28, a means for preventing the deviation between the input coordinate and the detected coordinate will be described.

FIG. 28 is a block diagram showing a main portion of the coordinate input device of this example. The components of the coordinate input device of this example and the method for driving the LCD panel are similar to those of Example 6, except that a correction circuit 52 is disposed downstream of the coordinate detection circuit 36. The correction circuit 52 includes, for example, a status detection portion 53 for detecting the status of the back light 59, a correction value calculating portion 54, and a correction portion 55.

The operation of the correction circuit 52 will be described. The operation status of the back light 59 varies depending on the ambient temperature, the luminance adjustment volume, the contrast adjustment volume, and the like. Accordingly, the level of the back light noise is not constant. In order to eliminate such back light noise, the status detection portion 53 detects the oscillating frequency and the amplitude of the output of the inverter 60. The correction value calculating portion 54 calculates a correction value based on the oscillating frequency and the amplitude of the output of the inverter 60 obtained at the status detection portion 53. The correction value is calculated so as to correspond to the level of the back light noise. When the efficiency of the transmission of a signal from the inverter 60 to the back light 59 varies depending on the position on the LCD panel, a value to offset the variation in the efficiency depending on the position is stored in advance in a memory 63. The value is used for the calculation of the correction value at the correction value calculating portion 54, together with the oscillating frequency and the amplitude. The correction portion 55 is connected to the correction value calculating portion 54 and the coordinate detection circuit 36. In the correction portion 55, the correction value calculated at the correction value calculating portion 54 is subtracted from the coordinate value detected by the coordinate detection circuit 36, and thus the back light noise is eliminated.

The oscillating frequency and the amplitude of the output of the inverter 60 can be adjusted by the operator. The initial phase of the noise entering the signal for the coordinate detection is known. Only the frequency and the amplitude of the noise are unknown. Accordingly, by pressing at least two positions and calculating the amount of the deviation of the detected coordinates from the actual coordinates, the oscillating frequency and the amplitude required for the correction can be calculated.

As described above, by using the correction circuit 52, the back light noise can be eliminated from the signal for the coordinate detection. When the oscillating frequency and the amplitude of the noise do not largely vary, the status detection portion 53 can be omitted from the correction circuit 52, setting the oscillating frequency and the amplitude of the noise as fixed data.

EXAMPLE 8

Figure 29:
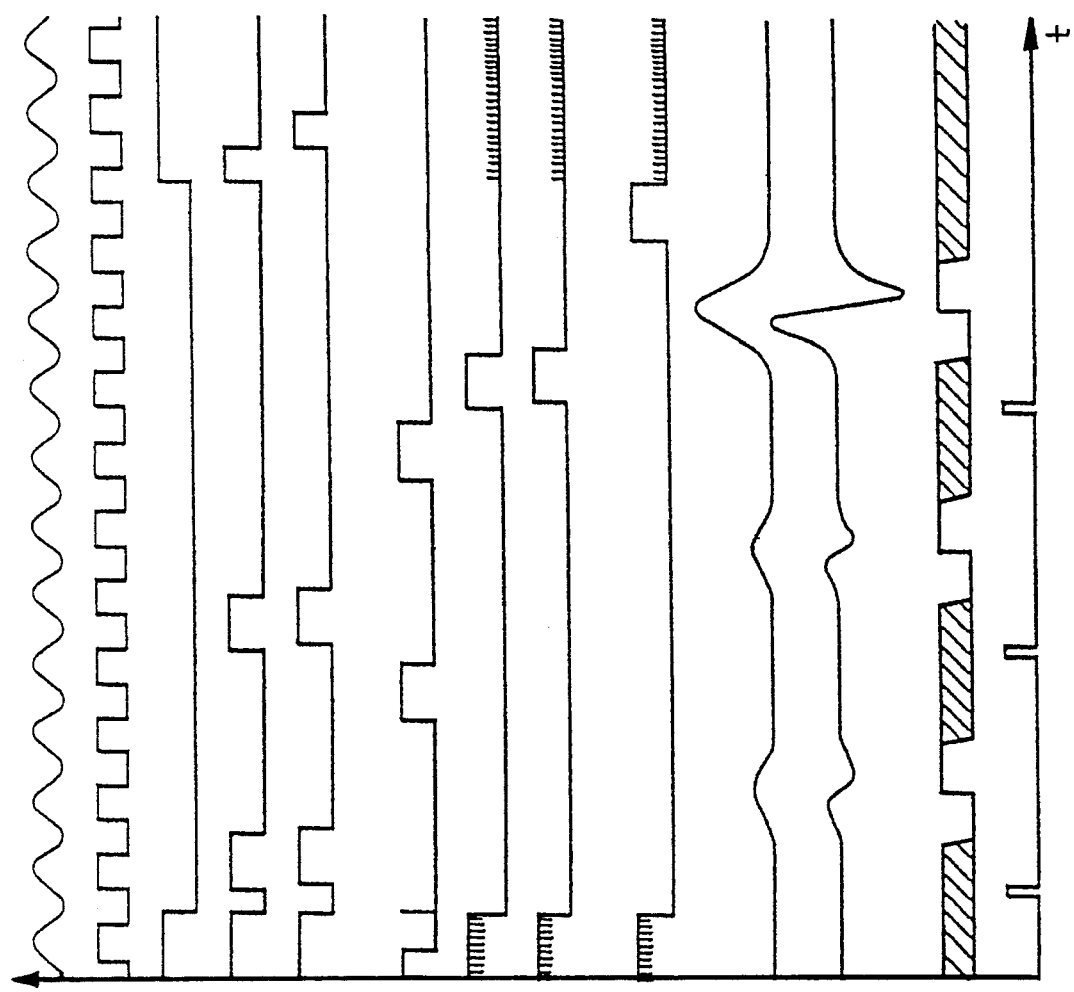
FIG. 29 is a timing chart showing the operation of a coordinate detection circuit of an eighth example according to the present invention.

Referring to FIG. 29, an eighth example of the present invention will be described.

The components of the coordinate input device of this example are the same as those of Example 6. The display operation of this example is also the same as that of Example 6. The description thereof is therefore omitted. The coordinate detection operations of this example which are different from those of Example 6 will be described as follows:

In the row coordinate detection period, while the potential at the column electrodes 21 is fixed, a scanning pulse is sequentially applied to the row electrodes 20 as in the display period. As shown in FIG. 29, the scanning of the row electrodes 20 is started, i.e., the scanning pulse is applied to a first row electrode y1, synchronously with the output of the inverter 60. Also, the LCD controller 5 also supplies the scanning start pulse to the coordinate detection circuit 36 synchronously with the output of the inverter 60. This scanning is repeated twice, and the average of the detected coordinates is determined as the row coordinate. The starts of these repeated scannings are adjusted to be synchronous with the output of the inverter 60 so that the phases of the output of the inverter 60 at the start of the scannings differ from each other by 180°.

Likewise, in the column coordinate detection period, while the potential at the row electrodes 20 is fixed, a scanning pulse is sequentially applied to the column electrodes 21 as in the display period. As shown in FIG. 29, the scanning of the column electrodes 21 is started, i.e., the scanning pulse is applied to a first column electrode x1, synchronously with the output of the inverter 60.

In this example, the row electrodes 20 are disposed on the front substrate of the LCD panel. Therefore, unlike the case of the above column coordinate detection, it is not necessary to repeat the scanning to average the detected coordinates, though it is possible to conduct the averaging procedure as described above so as to obtain the row coordinate.

The coordinate value is determined by the coordinate detection circuit 36 by detecting the peak position of the signal obtained from the scanning. The configuration of the coordinate detection circuit 36 is the same as that of Example 1 shown in FIG. 11. The signal transmitted from the LCD panel through the finger 57 or the detective pen enters the input pad 37, and passes the differentiating circuit 40 and the comparator 41, where the signal is converted to a digital signal of which value changes at the peak position. The counter 46 starts the counting operation upon receipt of the scanning start pulse and counts until the output of the comparator 41 changes. Based on the count by the counter 46, the coordinate value of the position pressed with the finger 57 or the detective pen is calculated.

Figure 30:
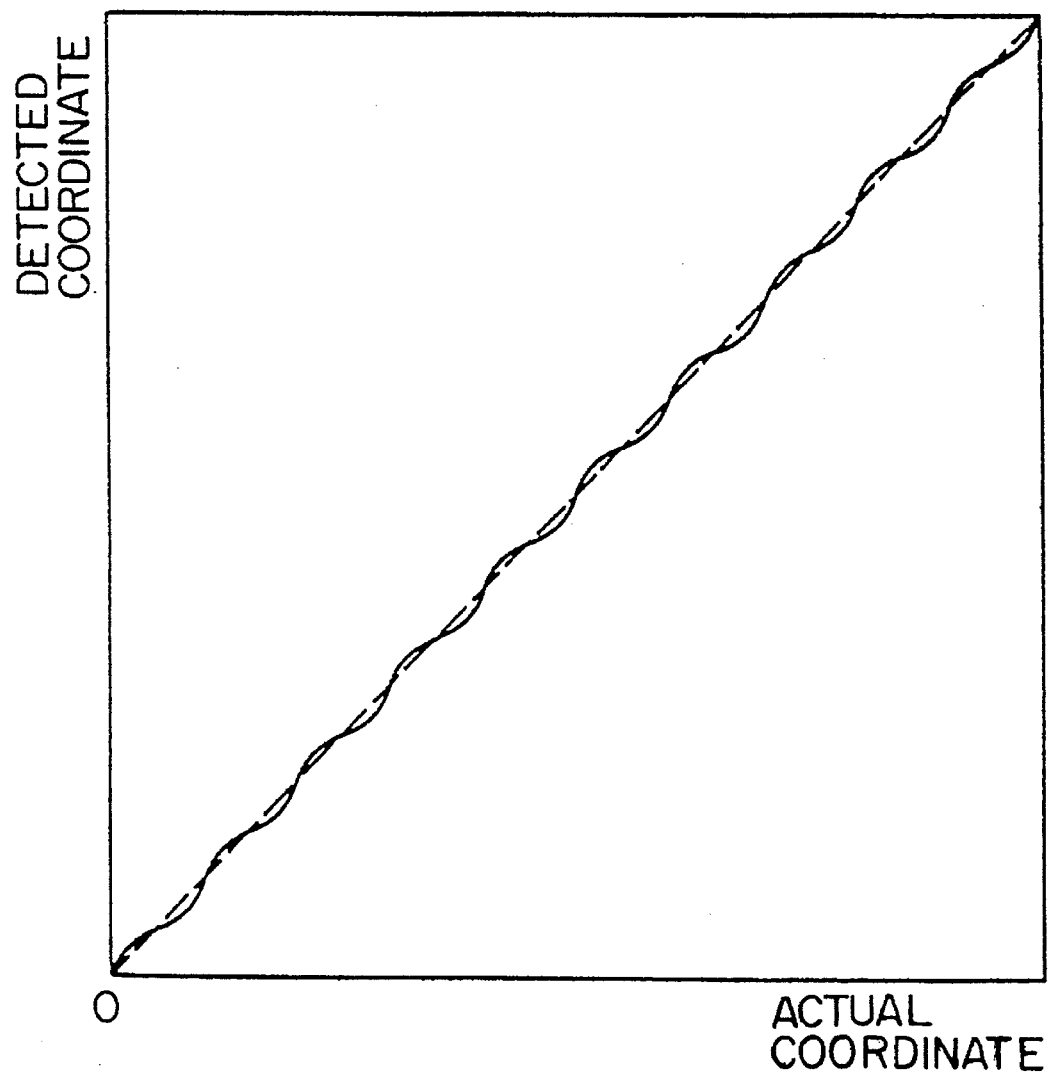
FIG. 30 is a graph showing the correlation between the coordinate of a position indicated by an indicator and the detected coordinate.

Referring to FIG. 30, the effects of this example will be described. FIG. 30 shows the correlation between the coordinate of the position pressed with the finger 57 or the detective pen and the detected coordinate.

According to the coordinate input device of this example, the twice-repeated scannings are started so that the phases of the output of the inverter 60 at the start of the scannings differ from each other by 180°. Accordingly, the phases of the back light noises entering the signals obtained at the twice-repeated detection operations are inverse to each other. Such back light noises can be therefore offset by averaging the coordinates detected by the twice-repeated detection operations. As a result, the amount of the deviation between the coordinate detected by the coordinate detection operation and the actually indicated coordinate can be reduced as shown in FIG. 30, compared with that obtained in Example 6 shown in FIG. 27.

Thus, as described above, the precision of the detected coordinate can also be improved by starting the twice-repeated coordinate detection operations synchronously with the output of the inverter so that the phases of the output of the inverter are inverse to each other at the start of the scannings and averaging the coordinate values obtained.

The reduction of the back light noise and therefore the increase in the resolution will be more effectively realized by repeating the coordinate detection operations several times and averaging the coordinate values obtained.

The signal obtained from the electrodes disposed on the front substrate of the LCD panel has an S/N value nearly ten times as large as that of the signal obtained from the electrodes disposed on the back substrate thereof. Accordingly, as in Example 6, the above-described averaging operation is not necessary for the electrodes on the front substrate. Without the averaging, the precision of the coordinate detection is as high as the precision of the coordinate detection based on the signal obtained from the electrodes on the back substrate obtained by averaging.

This example may also be provided with the means for calculating the back light noise to eliminate it from the signal for the coordinate detection as described in Example 7.

EXAMPLE 9

A ninth example of the present invention will be described.

The components of the coordinate input device of this example and the operation thereof are the same as those of Example 8. In the row and column coordinate detection periods, the twice-repeated coordinate detection operations are started synchronously with the output of the inverter so that the phases of the output of the inverter are inverse to each other at the start of the scannings. This example is different from Example 8 in the configuration of the coordinate detection circuit.

The configuration of the coordinate detection circuit is the same as that shown in FIG. 15. The signals for the coordinate detection are obtained through the finger or the detective pen by the twice-repeated coordinate detection operations which are started at such a timing that the phases of the output of the inverter at the start of the scannings are inverse to each other. Such signals are received by the input pad 37 and, after an appropriate amplification, sent to the A/D converter 49 where they are temporarily stored in the waveform memory 50. These two signals for the coordinate detection are added by the operation circuit 51, thereby to offset the back light noise. Based on the waveform data of the added signal, a peak value of the signal is calculated. The calculated peak value is used to determine the coordinate value of the position pressed with the finger or the detective pen, and the resultant value is output. The timing at which the scanning is started at the coordinate detection operations is as described in Example 8 shown in FIG. 29.

The coordinate input device of this example is especially suitable for the driving method described in Japanese Laid-Open Patent Publication No. 61-60117, for example.

Thus, as described above, by averaging a plurality of signals and calculating the peak position based on the averaged signal, the deviation between the detected coordinate and the actually indicated coordinate caused by the back light noise can be eliminated. The resolution is further improved by repeating the coordinate detection operations several times and averaging the coordinate values obtained.

The signal obtained from the electrodes disposed on the front substrate of the LCD panel has an S/N value nearly ten times as large as that of the signal obtained from the electrodes disposed on the back substrate thereof. Accordingly, as in Example 6, the above-described averaging operation is not necessary for the electrodes on the front substrate. Without the averaging, the precision of the coordinate detection is as high as the precision of the coordinate detection based on the signal obtained from the electrodes on the back substrate obtained by averaging.

In Examples 6 to 9, the scanning of the row electrodes and the column electrodes is conducted synchronously with the output of the inverter. However, an externally commutated inverter may be used for the synchronous operation.

In Examples 6 to 9, one coordinate detection operation is conducted for the display operation of one frame. However, a plurality of coordinate detection operations may be repeated for the display operation of one frame, or one coordinate detection operation may be conducted for the display operations over plural frames.

In the above examples, the functions of the column electrodes and the row electrodes may be reversed, so as to obtain the same effects as described above.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A coordinate input device comprising:
    a display panel including:
        a plurality of row electrodes and a plurality of column electrodes arranged in a matrix; and
        a plurality of display elements, each connected to one of the crossings of the plurality of row electrodes and the plurality of column electrodes;
    row electrode driving means for, during a display period and a row coordinate detection period, sequentially supplying row electrode driving signals to the plurality of row electrodes to effect scanning of the plurality of row electrodes, and for fixing the potential of the plurality of row electrodes constant during a column coordinate detection period;
    column electrode driving means for sequentially supplying display signals to the plurality of column electrodes during the display period, for sequentially supplying column electrode driving signals to the plurality of column electrodes to effect scanning of the plurality of column electrodes during the column coordinate detection period, and for fixing the potential of the plurality of column electrodes constant during the row coordinate detection period;
    coordinate detection means for detecting a coordinate value of an indicated position on the display panel;
    a back light disposed on the back side of the display panel for illuminating the display panel;
    an inverter circuit for generating a back light driving signal for driving the back light;
    control means for effecting switching among the display period, the row coordinate detection period, and the column coordinate detection period, the control means controlling the row electrode driving means to supply the row electrode driving signals in Synchronization with the back light driving signals during the row coordinate detection period, and controlling the column electrode driving means to supply the column electrode driving signals in synchronization with the back light driving signals during the column coordinate detection period; and
    further comprising status detection means for detecting the oscillating frequency and the amplitude of the back light driving signals correction value calculating means for calculating a correction value of the indicated position based on the detected oscillating frequency and the amplitude, correction means for receiving the coordinate value of the indicated position from the coordinate detection means and the correction value from the correction value calculating means and for subtracting the correction value from the coordinate value.

2. A coordinate input device according to claim 1, wherein the coordinate detection means detects coordinate values of at least two predetermined positions, and the status detection means compares the detected coordinate values with actual coordinate values of the at least two predetermined positions and detects the oscillating frequency and the amplitude of the back light driving signals based on any difference between the detected coordinate values and the actual coordinate values.

* * * * *